(12) United States Patent
Leveille et al.

(10) Patent No.: US 10,823,713 B2
(45) Date of Patent: Nov. 3, 2020

(54) SYSTEMS, METHODS, AND DEVICES FOR PROVIDING PRESSURIZED SOLVENT FLOW

(71) Applicant: WATERS TECHNOLOGIES CORPORATION, Milford, MA (US)

(72) Inventors: Wade P. Leveille, Douglas, MA (US); Jonathan L. Belanger, Witinsville, MA (US); Moon Chul Jung, Waltham, MA (US); Abhijit Tarafder, Franklin, MA (US); Joseph Michienzi, Plainville, MA (US); Keith Fadgen, Hope Valley, RI (US); Kevin Wyndham, Upton, MA (US); Xiangjin Song, Westborough, MA (US)

(73) Assignee: Waters Technologies Corporation, Milford, MA (US)

( * ) Notice: Subject to any disclaimer, the term of this patent is extended or adjusted under 35 U.S.C. 154(b) by 185 days.

(21) Appl. No.: 15/847,586

(22) Filed: Dec. 19, 2017

(65) Prior Publication Data

US 2018/0202980 A1   Jul. 19, 2018

Related U.S. Application Data

(60) Provisional application No. 62/447,227, filed on Jan. 17, 2017.

(51) Int. Cl.
| | |
|---|---|
| *G01N 30/32* | (2006.01) |
| *B01D 15/16* | (2006.01) |
| *B65D 83/14* | (2006.01) |
| *G01N 30/38* | (2006.01) |

(52) U.S. Cl.
CPC .......... *G01N 30/32* (2013.01); *B01D 15/163* (2013.01); *B65D 83/14* (2013.01); *G01N 30/38* (2013.01); *G01N 2030/326* (2013.01); *G01N 2030/328* (2013.01)

(58) Field of Classification Search
CPC .. B01D 15/163; B65D 3/14; G01N 2030/326; G01N 2030/32; G01N 2030/328
See application file for complete search history.

(56) References Cited

U.S. PATENT DOCUMENTS

| | | | | |
|---|---|---|---|---|
| 725,640 | A * | 4/1903 | Wemmer | A16K 24/044 137/202 |
| 2,603,493 | A * | 7/1952 | Rusconi | F16K 24/046 137/202 |
| 2,705,502 | A * | 4/1955 | Thompson | B66F 7/18 137/202 |
| 2,935,990 | A * | 5/1960 | Biddle | F16K 24/046 137/202 |

(Continued)

FOREIGN PATENT DOCUMENTS

WO   2012022620 A1   2/2012

OTHER PUBLICATIONS

International Search Report and Written Opinion of International Application No. PCT/IB2017/058166; Completed on Feb. 8, 2018; dated Apr. 13, 2018.

*Primary Examiner* — John Fitzgerald
(74) *Attorney, Agent, or Firm* — Womble Bond Dickinson (US) LLP; Deborah M. Vernon; Heath T. Misley

(57) ABSTRACT

The present disclosure generally relates to systems, methods and devices for providing pressurized solvent flow in chromatography systems.

14 Claims, 15 Drawing Sheets

(56) References Cited

U.S. PATENT DOCUMENTS

| | | | | |
|---|---|---|---|---|
| 3,113,103 | A * | 12/1963 | Lowery | G01N 30/90 210/198.2 |
| 3,185,303 | A * | 5/1965 | Johnson | C02F 1/42 210/136 |
| 3,733,449 | A * | 5/1973 | Parker | F04B 23/025 200/81 R |
| 3,746,263 | A * | 7/1973 | Reeder | F16K 15/04 239/542 |
| 3,896,675 | A * | 7/1975 | Stearns | G01P 3/28 73/497 |
| 4,310,420 | A * | 1/1982 | Konishi | B01D 15/14 210/101 |
| 4,448,684 | A * | 5/1984 | Paradis | G01N 30/32 210/198.2 |
| 4,599,049 | A * | 7/1986 | Gordon | F04B 13/00 417/205 |
| 4,836,038 | A * | 6/1989 | Baldwyn | G01N 30/24 73/864.21 |
| 4,980,059 | A * | 12/1990 | Barlow | G01N 30/36 210/101 |
| 4,981,597 | A * | 1/1991 | Allington | G01N 30/34 210/101 |
| 4,994,180 | A * | 2/1991 | Sims | B01D 15/08 137/512 |
| 5,044,397 | A * | 9/1991 | Szlaga | B60K 15/03519 137/202 |
| 5,108,928 | A * | 4/1992 | Menard | G01N 1/18 422/68.1 |
| 5,241,998 | A * | 9/1993 | Ashraf-Khorassani | G01N 30/56 141/67 |
| 5,265,642 | A | 11/1993 | Buckminster | |
| 5,363,886 | A * | 11/1994 | Ashraf-Khorassani | G01N 30/56 141/11 |
| 5,435,335 | A * | 7/1995 | Klop | B67D 7/365 137/202 |
| 5,993,654 | A * | 11/1999 | Black | B01D 15/14 210/101 |
| 6,012,488 | A * | 1/2000 | Nichols | F16K 11/0743 137/625.11 |
| 6,058,964 | A * | 5/2000 | Cotton | F02M 37/04 123/509 |
| 6,257,052 | B1 * | 7/2001 | Zelechonok | B01D 15/08 417/494 |
| 6,299,767 | B1 * | 10/2001 | Dourdeville | B01D 15/166 210/101 |
| 6,854,346 | B2 * | 2/2005 | Nimberger | G01N 1/2258 73/863.72 |
| 7,303,096 | B2 * | 12/2007 | Speight | F04B 23/02 222/64 |
| 8,241,013 | B2 * | 8/2012 | Moeller | F04B 7/0007 137/625.41 |
| 8,312,762 | B2 * | 11/2012 | Fadgen | G01N 30/20 73/61.55 |
| 8,672,289 | B2 * | 3/2014 | Fenwick | F16K 1/14 137/410 |
| 10,076,643 | B2 * | 9/2018 | Seaver | A61M 27/006 |
| 10,103,015 | B2 * | 10/2018 | Arnold | G01N 1/405 |
| 10,238,989 | B2 * | 3/2019 | Luongo | G01N 30/34 |
| 2002/0059945 | A1 * | 5/2002 | Maiefski | B01J 19/0046 134/25.1 |
| 2005/0016912 | A1 * | 1/2005 | Bomberger | A61M 1/3496 210/321.78 |
| 2005/0194298 | A1 * | 9/2005 | Usowicz | G01N 1/14 210/98 |
| 2006/0201885 | A1 | 9/2006 | Davison | |
| 2006/0219633 | A1 * | 10/2006 | Horsman | B01D 15/165 210/635 |
| 2007/0113790 | A1 * | 5/2007 | Akerman | A01J 5/0134 119/14.02 |
| 2007/0157928 | A1 * | 7/2007 | Pujol | F24F 6/12 128/204.14 |
| 2010/0024906 | A1 | 2/2010 | Moeller et al. | |
| 2010/0132805 | A1 * | 6/2010 | Kshirsagar | F16K 24/046 137/202 |
| 2010/0219127 | A1 * | 9/2010 | Horsman | B01D 15/165 210/635 |
| 2011/0133077 | A1 * | 6/2011 | Henion | G01N 1/405 250/288 |
| 2011/0201009 | A1 * | 8/2011 | Quake | G01N 15/1459 435/6.12 |
| 2012/0090715 | A1 * | 4/2012 | Fenwick | F16K 31/50 137/801 |
| 2012/0205314 | A1 * | 8/2012 | Davison | B01D 15/166 210/656 |
| 2014/0166557 | A1 * | 6/2014 | Horsman | B01D 15/165 210/141 |
| 2014/0326664 | A1 * | 11/2014 | Joudrey | G01N 30/20 210/635 |
| 2014/0367319 | A1 * | 12/2014 | Luongo | G01N 30/34 210/198.2 |
| 2016/0082232 | A1 * | 3/2016 | Seaver | A61M 39/24 604/10 |
| 2016/0146370 | A1 * | 5/2016 | Kelly | F16K 31/20 137/202 |
| 2017/0189831 | A1 * | 7/2017 | James | G01N 30/6091 |
| 2017/0316926 | A1 * | 11/2017 | Arnold | G01N 1/405 |

* cited by examiner

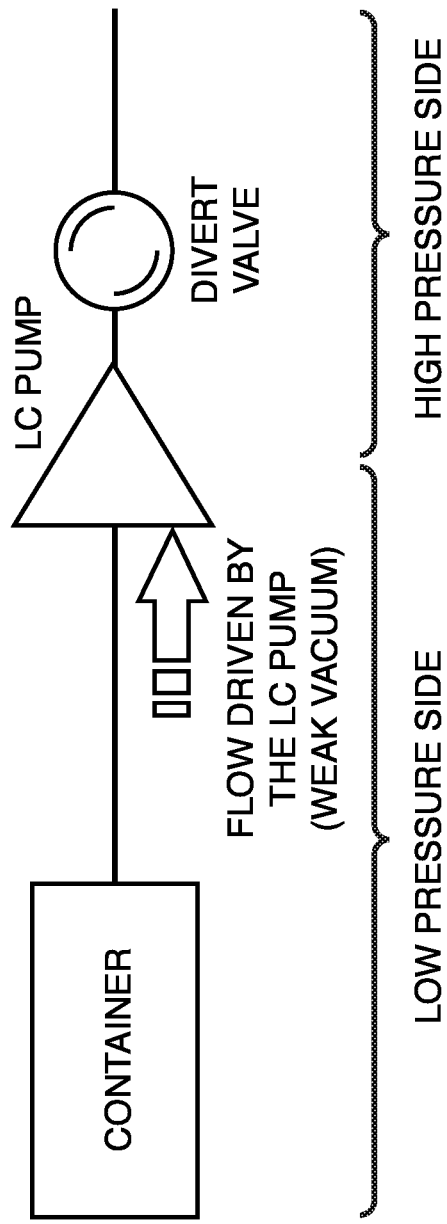
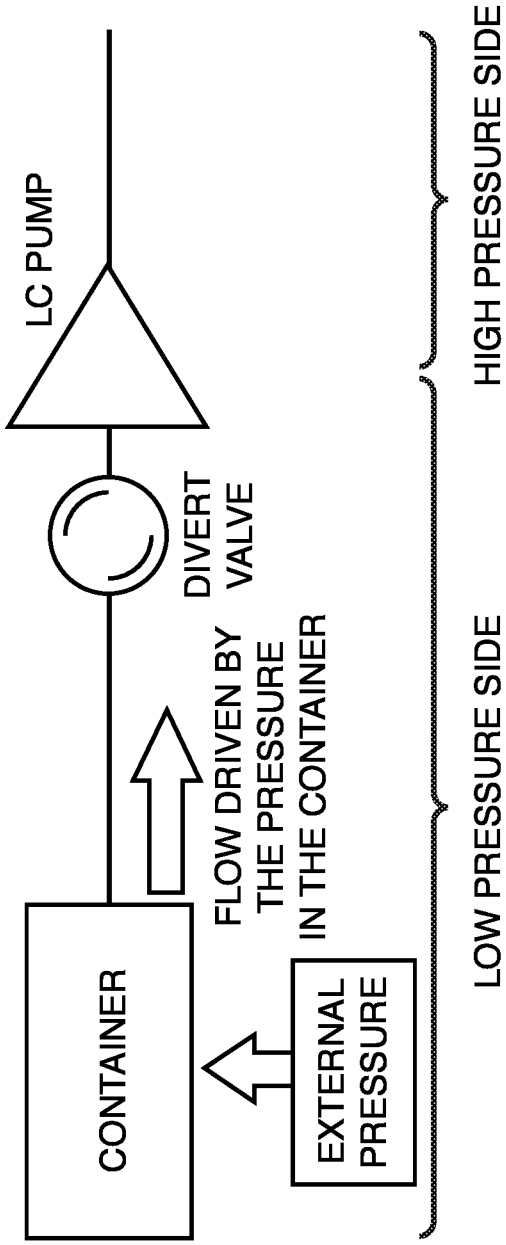

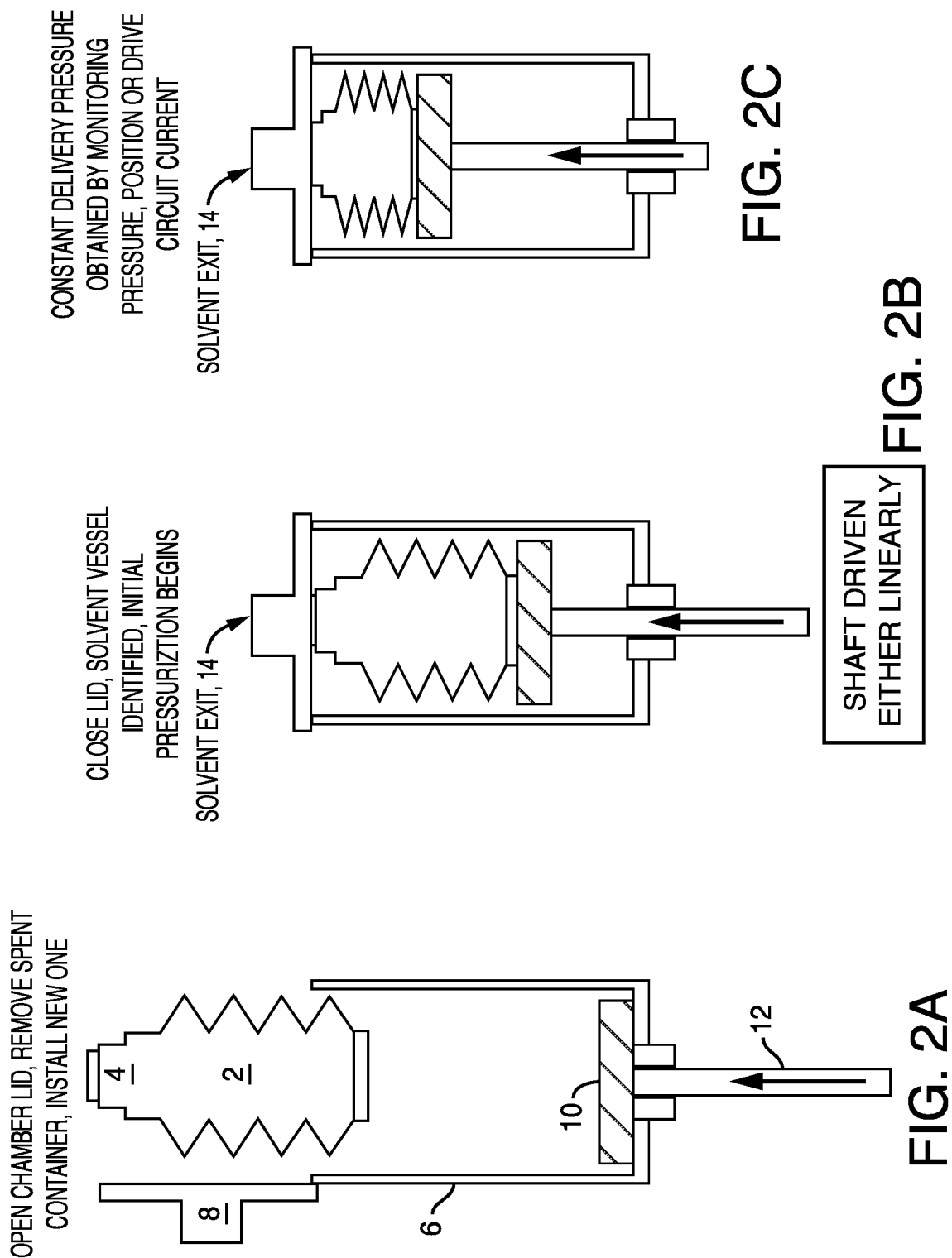

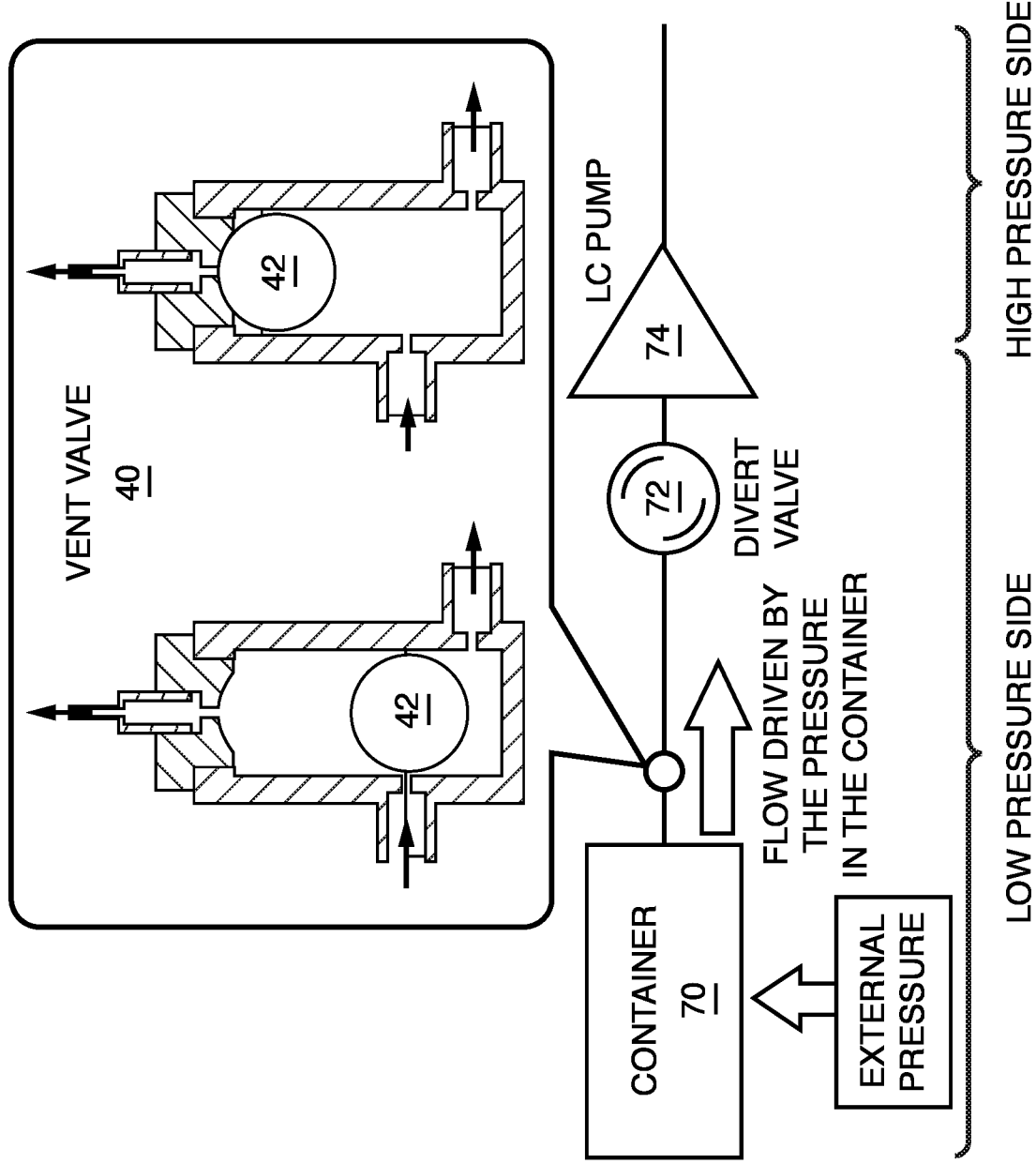

SYSTEMS, METHODS, AND DEVICES FOR PROVIDING PRESSURIZED SOLVENT FLOW

RELATED APPLICATIONS

This application claims the benefit of U.S. Provisional Patent Application Ser. No. 62/447,227 titled "Systems, Methods, and Devices for Providing Pressurized Solvent Flow" filed on Jan. 17, 2017, the content of which is incorporated herein by reference in its entirety.

FIELD OF THE INVENTION

The present disclosure generally relates to systems, methods and devices for providing pressurized solvent flow in chromatography systems.

BACKGROUND OF THE INVENTION

Chromatography systems utilize high pressure mobile phases to carry samples through chromatography columns and effect separations of sample components. The high pressure mobile phases are delivered to the columns using one or more pumps. The pumps deliver a highly controlled, consistent and reproducible mobile phase flow. The solvents that are supplied to the pump to generate the mobile phase are often less controlled. The solvent flow(s) are often driven only by action of the downstream pump. For example, the solvent is drawn to the pump by the vacuum created by the operating pump, e.g., a reciprocating pump. The solvents, solvent reservoirs, and connections are typically not held under pressure.

When introducing new solvents to a chromatography system, or when changing solvents or solvent tubing the pump can require priming or re-priming. Priming saves time and reduces complications related to air bubbles in the system. Traditionally, priming involves drawing the solvent manually or using a weak vacuum though the solvent tubing to remove old solvent and/or air bubbles from the solvent lines. Yet, automated priming using pressurized solvents has not been attempted.

SUMMARY OF THE INVENTION

The present disclosure relates to systems, methods and devices for providing pressurized solvent flow(s) to systems, such as a chromatography system. The solvent can be pressurized to assist in system operation and solvent delivery. The systems, methods and devices can provide efficient automatic priming of one or more solvents.

In one embodiment, the present disclosure relates to a chromatographic solvent delivery system including at least one pressurized solvent source, at least one divert valve in fluid communication with the at least one solvent source, and a pump in fluid communication with the at least one divert valve, wherein the at least one divert valve is located in between the at least one solvent source and pump, and wherein the at least one divert valve is adapted for diverting a solvent flow stream from the pump to an auxiliary flow path.

In another embodiment, the present disclosure relates to a pressurized solvent source including a solvent container configured to be pressurized, such as by being physically deformed to adjust the volume inside the container, a mechanism to engage with the container and configured to pressurize the container, such as by deforming the container, and at least one sensor configured to determine the pressure, volume or solvent flow from, inside the container. The at least one sensor can be a gravimetric or optical sensor.

In another embodiment, the present disclosure relates to a chromatographic solvent delivery system including at least one pressurized solvent source having a first sensor configured to determine the amount of solvent remaining in the solvent container, at least one backup pressurized solvent source having a second sensor configured to determine the amount of solvent remaining in the solvent container, a switching valve in fluid communication with both solvent sources and a chromatography system, and a controller in data communication with the sensors, the controller having knowledge of future solvent requirements and configured to switch the fluid connections between the solvent sources and the chromatography system. In another embodiment, the present disclosure relates to a chromatographic solvent delivery system and method related to active monitoring of levels or amount remaining of one or more pressurized solvents, and in some embodiments, notification and/or automatic replacement, of one or more pressurized solvents.

In another embodiment, the present disclosure relates to a vent valve including a main body having central axis, a top side and a bottom side, the body having an inlet and an outlet wherein the inlet is positioned closer to the bottom side than the outlet, the top side having an opening, and a mechanism to allow gas or air to escape or vent out the top side or opening but prevents solvent from escaping or venting out the same top side or opening. The mechanism can include a buoyant ball contained within the main body, e.g., a cylinder, having a shape equal to the internal shape of the main body wherein the ball is able to freely move up and down inside the main body, or a seat and a plunger valve contained at or near the top side. The main body can also include a cap having a second outlet, the cap being attached to the top of the main body.

In another embodiment, the present disclosure relates to a chromatographic solvent delivery system including a pressurized solvent source having a first sensor, a backup pressurized solvent source having a second sensor, a first vent valve in fluid communication with the pressurized solvent source, a second vent valve in fluid communication with the backup pressurized solvent source, a switching valve in fluid communication with the solvent sources, divert valve in fluid communication with the solvent sources, a pump in fluid communication with the divert valve, and a controller in data communication with the sensors, vent valves, switching valves, divert valve and pump.

In another embodiment, the present disclosure relates to a pressurized solvent source comprising a solvent container configured to be pressurized.

In some embodiments, the solvent container can comprise a container body and a solvent outlet. The solvent outlet can be arranged below and spaced from the container body by a predetermined distance, such that the solvent at the solvent outlet is pressurized due to gravity. In some embodiments, the solvent container can be hermetically sealed, with a single solvent outlet. In some embodiments, the solvent container can comprise a pouch, cylinder or bag. In some embodiments, the solvent container can be substantially flexible. In some embodiments, the solvent container may comprise a vent, to assist with the flow of liquid.

In some embodiments the solvent source includes a chamber. The solvent container can be at least partially received in the chamber. In some embodiments, the chamber can be substantially rigid. In some embodiments, the chamber can be less flexible than the solvent container. In some embodiments, the chamber can have a top opening. The top opening can be optionally closable by a lid.

In some embodiments, the solvent source further includes a force applicator to apply a force on at least a part of the container so as to selectively pressurize the container. In some embodiments, the force applicator can include one or more of a wedge, cam, lever, roller or plunger.

In some embodiments, the pressurized solvent source can further include a chamber and the force applicator comprises a plunger. The solvent container can be at least partially received in the chamber and the plunger engages with the solvent container. In some embodiments, the plunger can be configured for linear translation within the chamber. This can apply a force to the container to selectively pressurize the container. In some embodiments, a spring is provided between the chamber and the plunger. This can bias the plunger into engagement with the solvent container to selectively pressurize the container.

In some embodiments, the force applicator comprises: a first wedge member having a first wedge surface and being mounted for linear translation towards the solvent container; and a second wedge member having a second wedge surface and being mounted for linear translation towards the first wedge member, wherein the first and second wedge surfaces are engagable with one another to apply a force to the solvent container to selectively pressurize the container.

In some embodiments, the pressurized solvent source further includes: a chamber having a wall; and a pressure plate hingedly secured to the wall of the chamber; wherein the solvent container is arranged between a first side of the pressure plate and the wall of the chamber, and the force applicator is configured to impart a force on the second side of the pressure plate.

In some embodiments, the force applicator is configured to apply a force in a direction substantially parallel to the wall of the chamber. In some embodiments, the force applicator is configured to apply a force in a direction substantially perpendicular to the wall of the chamber.

In some embodiments, the force applicator comprises at least one roller mechanism, arranged to engage with the solvent container to apply a force to the solvent container to selectively pressurize the solvent container. In some embodiments, the roller mechanism can be translatable with respect to the solvent container, to progressively reduce the internal volume of the solvent container.

In some embodiments, the force applicator can be an inflatable bladder configured to apply a force to the solvent container. In some embodiments, the inflatable bladder can be arranged between the solvent container and the chamber, configured to displace solvent from the solvent container. In some embodiments, there can be a fluid source in communication with the bladder. In some embodiments, the force applicator can comprise a fluid source in fluid communication with the solvent container, configured to displace solvent from the solvent container. In some embodiments, the fluid can be an inert gas.

In another embodiment, the present disclosure relates to a chromatographic solvent delivery system comprising: a solvent source comprising a solvent container having a solvent outlet arranged below the solvent container, such that the solvent at the solvent outlet is pressurized due to gravity.

In another embodiment, the present disclosure relates to a pressurized solvent source comprising: a plurality of solvent bays, each solvent bay comprising a force applicator and being configured to receive a solvent container, each force applicator being individually controllable to apply a force to the corresponding solvent container in the corresponding bay.

In some embodiments each solvent bay can comprises a backing plate and each force applicator comprises a pressure plate which is movable towards or away from the corresponding backing plate of the respective solvent bay. In some embodiments, a spacer can be connected to the backing plate or pressure plate, to limit the minimum distance between the backing plate and pressure plate in use. In some embodiments, each solvent bay can comprise a sensor to detect the presence of at least one solvent container therein. In some embodiments, the force applicator can be configured to apply a substantially constant force in use. In some embodiments, force applicator includes a motor, air source or other driving device. In some embodiments, the solvent source comprises multiple solvent bays. In some embodiments, the solvent source comprises between 1 and 8 solvent bays. In some embodiments, the solvent source comprises 2, 3 or 4 solvent bays. In some embodiments, the solvent source comprises 4 solvent bays.

As described below in greater detail, particular advantages arise from using the pressurized solvent feed system of the present technology. For example, the solvent delivery system can decrease the time required to set up a chromatography system initially or prepare the system after solvents are replaced. The system can improve the efficiency of priming in an automated chromatography system. The system can minimize or eliminate the potential for solvent outgassing when drawn from the solvent source to the pump under a vacuum. The system can reduce the required priming volume and time by including devices to remove gas or air bubbles from the solvent line. The removal of such gas or air can eliminate the entrapment of bubbles in the pump line and reduce the risk of the pump being air bound.

BRIEF DESCRIPTION OF THE DRAWINGS

The invention will be more fully understood from the following detailed description taken in conjunction with the accompanying drawings, in which:

FIG. 1A shows the prior art configuration with the divert valve downstream the pump in the high pressure side. FIG. 1B shows an embodiment of a chromatographic solvent delivery system in accordance with the present disclosure. In FIG. 1B, the system includes a pressurized solvent source/container, with a divert valve upstream of the pump.

FIG. 2A-C shows an embodiment of the present disclosure having a pressurized solvent source with a housing, lid, solvent container and piston. FIG. 2A shows the housing or vessel being opened and the solvent container be replaced. FIGS. 2B and 2C show the piston being driven to collapse and pressurize the solvent container in the vessel.

As shown in FIG. 4A, the gas flow out is open when the ball is in the lower portion. FIG. 4B shows an embodiment of the present disclosure having a vent valve with the buoyant ball in the upper portion. As shown in FIG. 4B, the gas flow out is stopped when the ball is engaged with, or touching, the outlet.

As shown in FIG. 5A, the gas flow out is open when the ball is in the lower portion. As shown in FIG. 5B, the gas flow out is stopped by the plunger and seat when the ball is engaged with, or touching, the plunger.

As shown in FIG. 6A, the gas flow out via the vent port is open when the plunger is low or not engaged. As shown in FIG. 6B, the gas flow out via the vent port is stopped by the plunger through the action of the actuator and the diaphragm.

FIG. 7 shows an embodiment of the present disclosure having a chromatographic solvent delivery system with a pressurized solvent source or container, a vent valve, a divert valve and a chromatography pump (LC). The vent valve and the divert valve are placed on the low pressure side of the chromatography system, e.g., upstream of the pump. The vent valve is shown with a buoyant ball in the lower portion and open position, and in the upper and closed position.

DETAILED DESCRIPTION OF THE INVENTION

Figure 3:
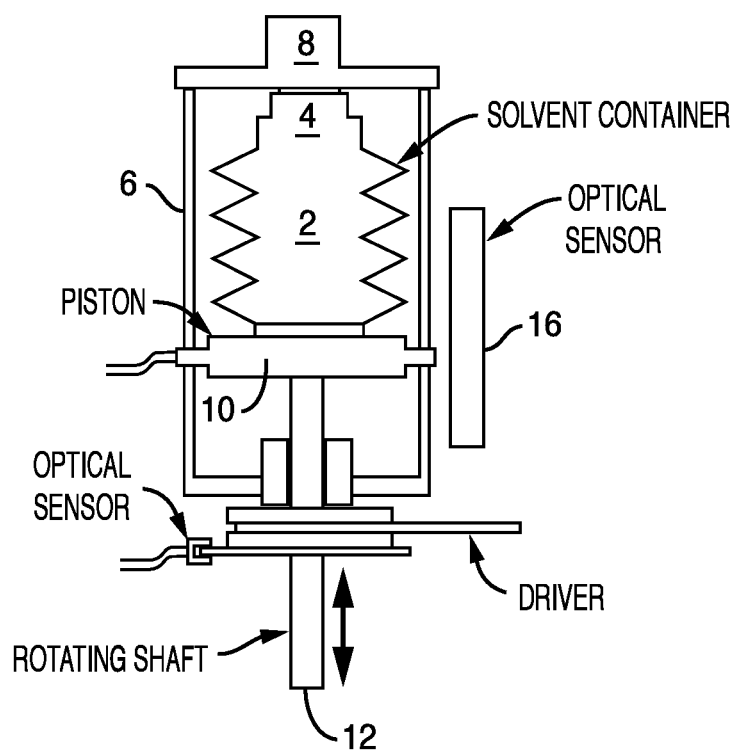
FIG. 3 shows an embodiment of the present disclosure having a pressurized solvent source with a housing, lid, solvent container, piston, optical sensors, a driver and rotating shaft.

The present disclosure generally relates to systems, methods and devices for providing pressurized solvent flow in chromatography systems.

In one embodiment, the present disclosure relates to a pressurized solvent feed system for chromatographic solvent managers. The system can include of one or more pressurized solvent containers and one or more divert valves positioned at the low-pressure side of a chromatographic solvent manager. The containers can be designed to push out solvent under pressure. The divert valves can be activated to discard undesirable content in the solvent tubing (e.g., purge). After a sufficient purging process, the divert valve can be switched back to direct the flow to the pump heads. The system can enable efficient and consistent delivery of solvents to a chromatography pump and enable fully automated priming of the solvent system with increased efficiency.

The priming process is an important part of the chromatography system that ensures a liquid chromatography solvent manager is ready to reliably deliver the desired mobile phases. An effective solvent delivery system and priming process can clear out air bubbles and/or old mobile phases from the low-pressure side of a solvent delivery system and deliver consistent solvents to the pump. Inadequate priming can cause flow fluctuations from trapped air bubbles or the delivering incorrect solvents and mobile phases.

An embodiment of the present disclosure relates to a chromatography solvent delivery system including at least one pressurized solvent source, at least one divert valve in fluid communication with each solvent source, and a pump in fluid communication with each divert valve. Each divert valve can be located in between the respective solvent source and pump. Each divert valve is adapted for diverting a solvent flow stream to the pump or to an auxiliary flow path, e.g., waste.

The system can be used with a number of chromatography systems, such as liquid chromatography (LC), high performance liquid chromatography (HPLC), highly-compressible fluid chromatography (sometimes referred to as supercritical fluid chromatography (SFC), or $CO_2$-based chromatography where $CO_2$ is used in the mobile phase).

The system can also be used with a number of different solvent types. For example, the system can include 1, 2, 3, 4, 5, 6, 7, 8, 9, 10, 11, 12, 13, 14, 15, 16, 17, 18, 19, 20, 21, 22, 23, 24, 25, 26, 27, 28, 29 or up to 30 different solvent types to provide one or more mobile phases, wash solutions, cleaning solutions, rinse solutions, etc. Each solvent can be a single liquid solvent, a mixture of liquids, or a solution with a dissolved solute. The solvents can be used as supplied, or the user can prepare one or more solvents. Additionally, in applications where a system is designed to switch between different operating modes without user intervention, the system can be provided with several complete sets of solvents. For example, in order to be able to run two different gradient separations, the system may have four mobile phase solvents. The system can receive two or more solvents which are mixed by the system, for example, to form a mobile phase for an isocratic separation, or to serve as one component of a gradient separation.

The solvent can be of any type, including aqueous and organic solvents, polar and nonpolar solvents, e.g., methanol, ethanol, acetonitrile, tetrahydrofuran, dimethoxyethane, chlorobutane, dichlorobenzene, pentanone, acetone, chloroform, cyclohexane, diethyl ether, ethyl acetate, pentane, hexane, heptane, toluene, water, and combinations of the same. The delivery system of the present disclosure can deliver one or more solvents to one or more different chromatography systems.

The system of the present application includes at least one pressurized solvent source. The system can include 1, 2, 3, 4, 5, 6, 7, 8, 9, 10, 11, 12, 13, 14, 15, 16, 17, 18, 19, 20, 21, 22, 23, 24, 25, 26, 27, 28, 29 or up to 30 different pressurized solvent sources. Each source can differ by solvent, pressure, solvent flow, container types and pressurization mechanism, as provided in the present disclosure.

Each pressurized solvent source can pump or push the solvent from the source to the divert valve and eventually to the pump. The pressurized solvent source addresses the fact that the majority of liquid chromatography pumps have pump heads with reciprocating plungers. These plungers are designed to deliver a precise volume of mobile phase against a high backpressure. These pumps are less efficient, however, in drawing a large volume of liquids and operating at a low pressure. They generate a weak vacuum and generally cannot automatically prime the solvent to the pump efficiently. The application of a pressure on the solvent source can pump or push the solvent at relatively low pressures. The pressure on the solvent source can pump or push the solvent from the source to the divert valve and eventually to the pump at a higher rate than a normal liquid chromatography pump can draw, such as at about 0.05 µL/min, 0.1, 0.5, 1, 5, 10, 50, 100, 500, 1 mL/min, 5, 10, 25, 50, 100, 500 or about 1000 mL/min. These values can be used to define a range, such as about 0.1 µL/min to about 25 mL/min. The pressurized solvent source can pump or push the solvent at a higher pressure than a normal liquid chromatography pump's intake pressure, such as at about 0.1 psi, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 6, 7, 8, 9, 10, 15, 20, 50 or about 100 psi. These values can be used to define a range, such as about 0.5 to about 10 psi. The pressurized liquid flow can be more effective in driving out air bubbles from an empty tube.

The system can include at least one divert valve. The divert valve can be in fluid communication with the solvent source and pump. The divert valve can be used with one or more solvent sources or flows. The system can have multiple divert valves. The system can also include at least one divert valve for each pressurized solvent source or flow. Each divert valve can be dedicated to a pressurized solvent source or flow. The divert valve can be used to, or can be adapted for diverting a solvent flow to the pump or to an auxiliary flow path. The auxiliary flow path can include flowing the stream to a waste stream or a waste container.

The divert valve can include at least one solvent inlet, at least one solvent outlet and at least one auxiliary outlet. For example, the divert valve can have a solvent source inlet, a solvent source outlet that provides solvent to a pump, and an auxiliary outlet to waste.

The system can also include at least one pump. The pump can be in fluid communication with the divert valve. The divert valve can be located between the solvent source and pump. To assist in removing air bubbles and/or old solvent from the low-pressure side of a solvent delivery system, one or more of the divert valves can be located at or near the pump. A divert valve placed near the pump heads can decouple the pump heads from the priming process. For example, the divert valve can be located within about 1 cm, 2, 3, 4, 5, 6, 7, 8, 9, 10, 11, 12, 13, 14, 15, 20, 30, 40 or about 50 cm of the pump. These values can be used to define a range, such as about 1 to about 5 cm. The majority of the solvent line between a solvent source and a pump can be located between the solvent source and the divert valve. For example, about 10%, 15, 20, 25, 30, 35, 40, 45, 50, 52, 54, 56, 58, 60, 62, 64, 66, 68, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or about 99.5% of such a solvent line can be located between the solvent source and divert valve.

FIG. 1A shows the prior art configuration with the divert valve downstream the pump in the high pressure side. FIG. 1B shows an embodiment of a chromatographic solvent delivery system in accordance with the present disclosure. In FIG. 1B, the system includes a pressurized solvent source/container, with a divert valve upstream of the pump in the low pressure side.

The priming process can be problematic when the chromatography system is new or in a dry state where the solvent tubes are filled with air. Because of the compressible nature of air, the weak vacuum created by the pump cannot move liquid through the solvent lines or tubing effectively. Manual priming to draw out trapped air within the tubing is required. The present disclosure allows for automated priming in new and dry systems. Automated priming (e.g., the removal of old solvent and the introduction of new solvent to the pump, the removal of air bubbles, or both, without manual intervention by the user) can be done in a short time, such as in less than about 5 minutes, 4, 3, 2, 1 or about 0.5 minutes. The automated priming of the present disclosure can reduce the time needed for priming as compared to traditional liquid chromatography systems (e.g., systems using reciprocal pumps, non-pressurized solvents, or both) by about 10%, 15, 20, 25, 30, 35, 40, 45, 50, 52, 54, 56, 58, 60, 62, 64, 66, 68, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or about 99.5%. These values can be used to define a range, such as about 50 to about 99%.

The system can also include a controller in digital or signal communication with one or more components of the system. The controller can be used to automatically prime the system without operator intervention. The pressurization of the solvent source or container can be also be performed automatically. The controlling of the divert valve can be performed automatically. As provided in the present disclosure, other components can also be controlled to perform automatically, e.g., the vent valve.

By placing the divert valve on the low pressure side of the pump, the internal volume of the high pressure side can be reduced. This reduction also reduces gradient delay volume. The system can reduce gradient delay volume by about 10%, 15, 20, 25, 30, 35, 40, 45, 50, 52, 54, 56, 58, 60, 62, 64, 66, 68, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or about 99.5% compared to system having divert values on the high pressure side. These values can be used to define a range, such as about 10 to about 30%.

While the system has been described for solvents related to mobile phases, the system can also be used to prime other chromatographic liquids, such as needle wash solvents and syringe pumps.

The current priming process used with liquid chromatography pumps includes drawing mobile phase from the solvent source to the pump head by creating a weak vacuum or pull on the solvent supply lines or tubing. The rate of draw can depend on the capacity of the reciprocating plungers in the pump heads as well as the solvent supply lines volume. In some cases, the solvent pull or vacuum can be sufficient to reach the vapor pressure of the supply solvent and create the potential for solvent outgassing. The system of the present disclosure reduces or eliminates outgassing risks by replacing the vacuum draw with applied pressure.

Pressure can be applied to the solvent source in many different ways. In one embodiment, the present disclosure relates to a pressurized solvent source including a solvent container configured to be pressurized, such as by being physically deformed to adjust the volume inside the container, a mechanism to engage with the container and configured to pressurize the container, such as deforming the container, and at least one sensor, e.g., pressure, flow or volume sensor, configured to determine the pressure, flow from, or volume inside the container. The sensor can be one configured to determine the amount of solvent remaining in the solvent container, such as a gravimetric or optical sensor.

The solvent container can be any size, shape, material, etc. that can contain a chromatography solvent and deliver the solvent to a chromatography system in a controlled manner as a result of an applied pressure. The solvent container can hold about 100 mL, 200, 300, 400, 500, 600, 700, 800, 900, 1000, 1200, 1400, 1600, 1800, 2000, 2500, 3000, 3500, 4000, 4500, 5000, 6000, 7000, 8000, 9000 or about 10000 mL of solvent. These values can be used to define a range, such as about 0.25 to about 2 L.

The solvent container can be formed into any shape, including a cylinder, collapsible bag or an accordion-style container. The container can be configured to be pressurized. For example, the container can be configured to be physically deformed to adjust the volume inside the container. The pressurization or physical deformation of the container can be gradual, such that the internal pressure or volume can change substantially continuously as pressure is applied. For example, the container volume can change by increments of about, or less than about, 5%, 1, 0.5, 0.01, 0.05 or about 0.001% with each similar increment of pressure applied. Increments of applied pressure can be measured in pressure, distance or current.

These applied pressures or mechanisms can be applied in stages or as a consistent pressure over time. The amount of pressure or movement of the mechanism can be in response to the level of remaining solvent, solvent flows and/or solvent flow pressure. The applied pressure or mechanism can keep the desired flow or pressure within 2%, 4%, 6%, 8%, 10%, 15%, or about 20% of a desired or original value. For example, a solvent container can be pressurized to deliver a solvent pressure of 25 psi. The applied pressure or mechanism on the solvent container can keep the solvent pressure at 25+/−10%.

The composition of the container can contain any material configured to be pressurized. In one embodiment, the composition of the container can contain a polymer, plastic, elastic or other deformable material. The container can be made of a material that substantially returns to its original form or shape when the applied pressure is removed, or when an opposite pressure is applied, e.g., a bladder is refilled. The container can also be made of a material that does not return to its original form after an applied pressure change in volume occurs, such as an accordion style container that starts with little or no folds, gets compressed and then returns to an uncompressed form with folds The container can have at least one opening wherein the solvent can be loaded and can exit. The container can have multiple openings, for example, one for solvent loading, solvent exit, pressurized gas loading and exit, or combinations thereof.

In some embodiments, the container can include an outer shell or chamber. The outer shell can be any size, shape, material, etc. that can contain a pressurizable container, such as a collapsible or accordion-style container (or any container having an inner volume that can change with applied pressure). The outer shell can be used to confine the container such that when an applied pressure is placed on the container the outer shell keeps the container from expanding or escaping the applied pressure.

For containers that can be physically deformed, the deformation can be performed by different mechanisms. The container can be deformed by the application of a physical force. The force can be applied on one or more sides, e.g., outside, of the container. For example, the physical force can be a moveable piston to press on one or more sides of the container. The force can be mechanically engaged with the container. The force, e.g., piston, can be driven by a shaft that is controlled by a controller. The controller can be in signal connection with at least one sensor.

The container can also be pressurized or deformed using gas displacement. The container, e.g., a bladder, can be deformed using a gas flown into the outer shell to displace the space taken up by the container. The gas flow, internal container pressure, or both can be controlled by a controller in signal connection with at least one sensor.

The configuration of the solvent container outlet can be positioned as to allow for a maximum evacuation of solvent from the container. The amount of solvent available to be used from the container can be about 80%, 85%, 90%, 95%, 98% or about 99% of the original solvent amount. The outlet can be placed on the top, side or bottom of the container. In one embodiment, the placement of the outlet is on the side or bottom to allow gravity to assist in evacuation of the solvent. Similarly, the volume inside the container can be changed from about 100% or the starting condition to about 90%, 80%, 70%, 60%, 50%, 40%, 30%, 20%, 10%, 5%, 2% or about 1% of the original container or starting condition. These values can define a range, such as about 25% to about 1%.

The container can also be pressurized using gas, e.g., inert gas, flown inside the container. For example, the solvent container can be utilized with the solvent exit positioned on the container bottom such that any gas introduced would form a headspace and exert pressure downward on the solvent. The gas can be inert or not reactive with the solvent. For example, the gas can be nitrogen gas. The gas can be introduced directly in to the headspace or it can be bubbled through the solvent. The applied pressure from an headspace can be 1 psi, 2, 3, 4, 5, 6, 7, 8, 9, 10, 15, 20, 50 or about 100 psi. Pressurizing the container with gas can rupture the container. The container must be sufficiently durable to withstand increased internal pressures. The use of pressure outside the container, such as a moveable piston, eliminates the rupture risk.

The container design can be such that when an external force is applied the internal solvent is raised to some pre-determined pressure level. Similarly, the pressure on the solvent can be about 1 psi, 2, 3, 4, 5, 6, 7, 8, 9, 10, 15, 20, 50 or about 100 psi. These values can be used to define a range, such as about 3 to about 20 psi.

The system, each container, each solvent flow stream or combinations thereof can include at least one sensor, e.g., pressure, flow, volume or combination sensor. The sensor can be configured to determine the pressure, flow from, or volume inside the container. The sensor can be a gravimetric sensor configured to determine changes in the weight of the solvent container. For example, the sensor can be a load cell. The sensor can also be an optical sensor. The optical sensor can measure the volume level inside the container. The weight or level changes in the container can provide a measure of the remaining solvent in the container and the rate over time of the solvent's use. The sensor can be in signal communication with a controller. The controller can also containing the chromatography methods and be in signal communication with the pump. The past, current and future requirements of the solvent of the chromatography system can be calculated and forecast. The determination of when the solvent container needs to be replaced as to not interrupt a chromatography system can be made.

FIGS. 2A-2C show a flexible solvent container system. The system includes an accordion-style collapsible container (2) having an opening (4) at the top of the container. The container is placed in an outer shell (6), or chamber, shaped like a cylinder. The chamber has a top lid (8) that can open and allow the solvent container to be placed in and out. The chamber has a bottom (10) that is moveable. The bottom can be moved or can be fitted with a surface or piston that can be moved to apply pressure to the bottom of the solvent container. The surface or piston can be driven by a shaft (12) driven in stages or linearly. The system can identify the solvent container and relay the identification to a controller. The system can confirm the solvent container is correct before proceeding. The piston can be driven against the flexible solvent container to pressurize the solvents. The chamber lid can have a solvent exit (14). The piston driven system can improve the efficiency of solvent delivery to a chromatography pump. The compressed solvent container can provide a slightly positive pressure at the pump inlet. Once the solvent container is loaded into the chamber, the system can be operated unattended. FIGS. 2B and 2C show the piston being driven to collapse and pressurize the solvent container in the vessel.

Although FIGS. 2A-2C show a system in which the piston applies pressure to the bottom of the solvent container, the opposite arrangement is also possible. For example, the piston could apply pressure to the top of the solvent container, and the solvent exit may be provided at the base of the arrangement.

Figure 10:
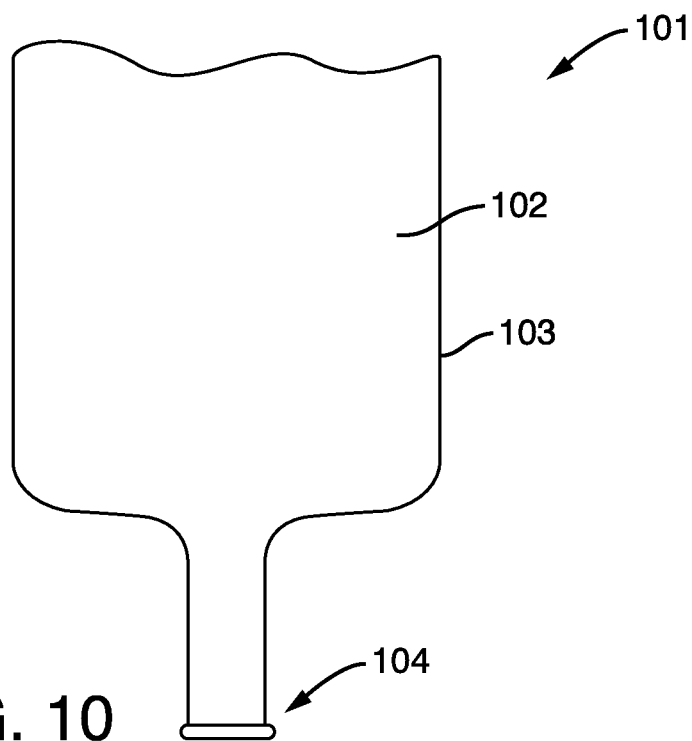
FIG. 10 shows an embodiment of the present disclosure having a pressurized solvent source.

FIG. 10 shows a pressurized solvent source (101) comprising a solvent container (102) configured to be pressurized. In the embodiment shown, the solvent container (102) can comprise a container body (103) and a solvent outlet (104). The solvent outlet (104) can be arranged below and spaced from the container body (103) by a predetermined distance. There can be a neck between the container body (103) and the solvent outlet (104). As a result of the position of the solvent outlet (104) below then container body (103), the solvent at the solvent outlet (104) is pressurized due to gravity. In some embodiments, the solvent container (102) is hermetically sealed, with a single solvent outlet (104). In some embodiments, the solvent container (102) can comprise a pouch, cylinder or bag. In some embodiments, the solvent container (102) can be substantially flexible.

Figure 11:
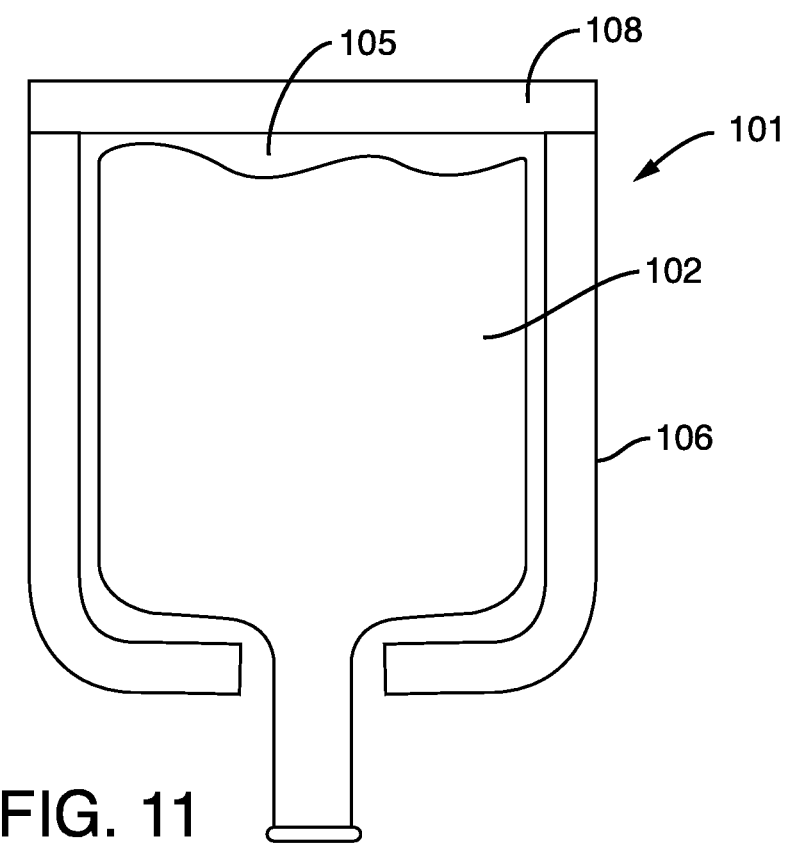
FIG. 11 shows an embodiment of the present disclosure having a pressurized solvent source including a chamber.

As shown in FIG. 11, in some embodiments, the solvent source (101) includes a chamber (106). The solvent container (102) can be at least partially received in the chamber (106). In some embodiments, the chamber (106) can be substantially rigid. In some embodiments, the chamber (106) can be less flexible than the solvent container (102). In some embodiments, the chamber (106) can have a top opening (107). The top opening (107) can be optionally closable by a lid (108). The lid (108) may preferably hermetically seal the chamber (106).

In some embodiments, the solvent source (101) further includes a force applicator to apply a force on at least a part of the solvent container (102) so as to selectively pressurize the container (102). Various embodiments of a force applicator will now be described.

Figure 12:
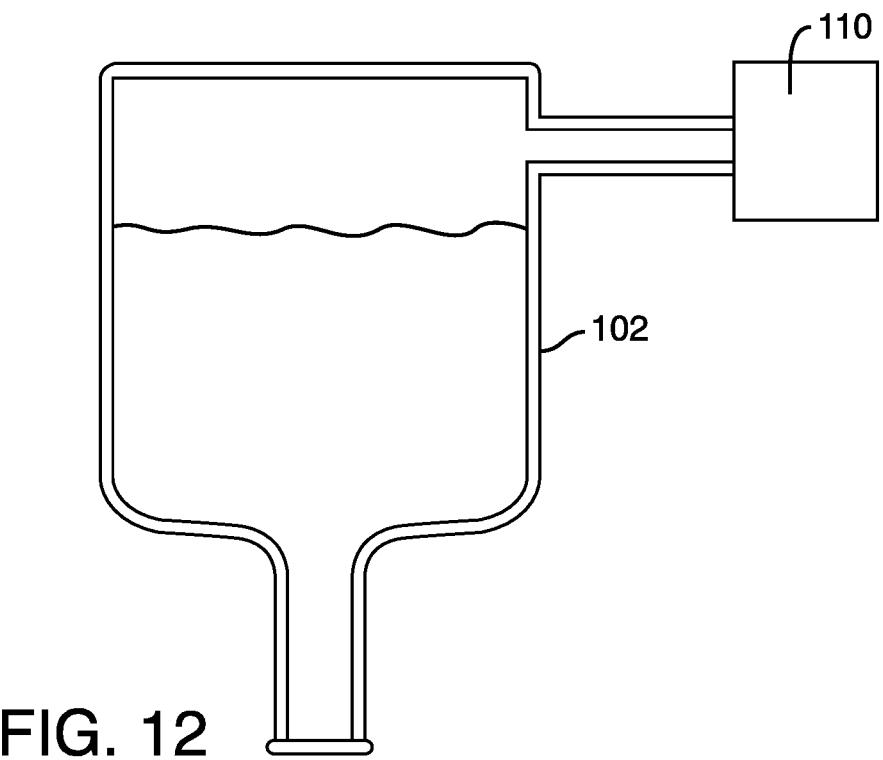
FIG. 12 shows an embodiment of the present disclosure having a pressurized solvent source including a force applicator in the form of a fluid source.
Figure 13A:
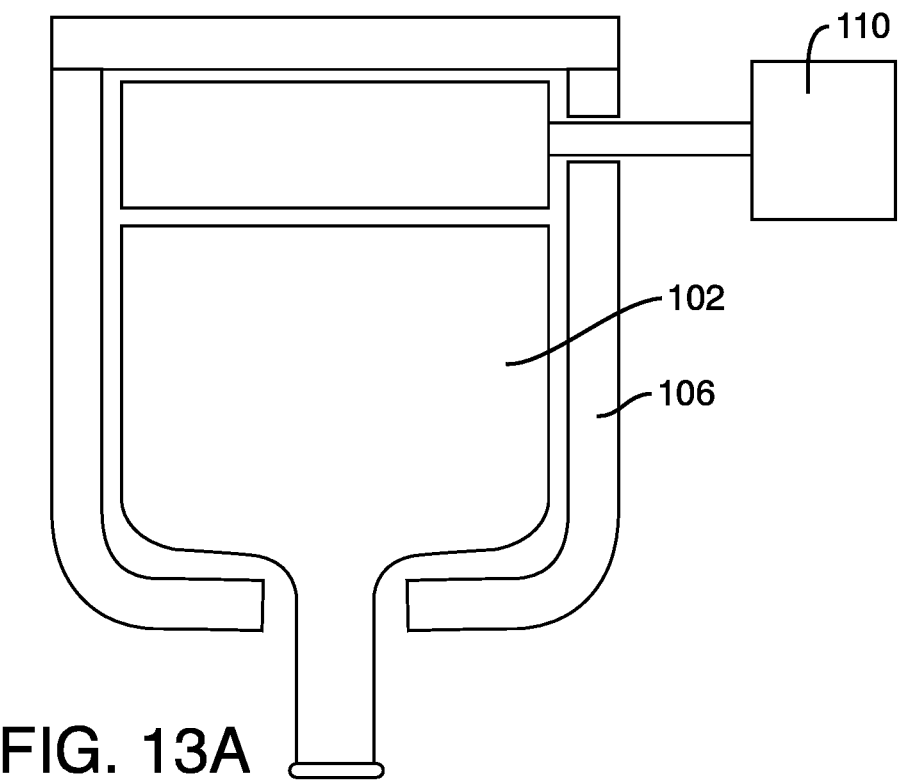
FIG. 13A shows an embodiment of the present disclosure having a pressurized solvent source including a force applicator in the form of a fluid source and inflatable bladder 111.

As shown in FIG. 12, the force applicator can comprise a fluid source (110) in fluid communication with the internal volume of the solvent container (102), configured to displace solvent from the solvent container (102). Because the solvent in the solvent container (102) is substantially incompressible, as fluid is provided from the fluid source (110), the increase in pressure between the top of the solvent and the top of the solvent container (102), causes solvent to be displaced from the solvent container (102). In an alternative embodiment, as shown in FIG. 13A, the force applicator can include an inflatable bladder (111) which can be arranged between the solvent container (102) and the top of a chamber (106). When the inflatable bladder (111) is connected to a fluid source (110), the inflatable bladder (111) is caused to inflate so as to displace the solvent in the solvent container (102). In either or both embodiments, the fluid of the fluid source (110) can be an inert gas.

Figure 13B:
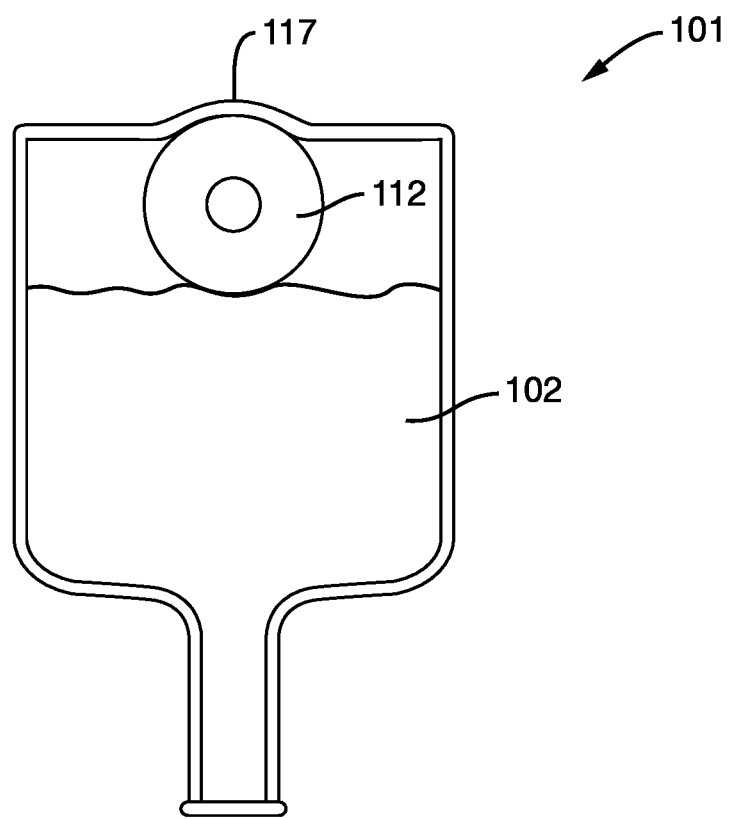
FIG. 13B shows an embodiment of the present disclosure having a pressurized solvent source including a force applicator in the form of a pressurised capsule configured to be punctured.

In an alternative embodiment, as shown in FIG. 13B, the force applicator includes a pressurised capsule (112) which is configured to be punctured. The pressured capsule (112) may contain a pressurised fluid. In some embodiments, the chamber is substantially rigid. In some embodiments, the chamber includes a protrusion (113) and the capsule (112) is located at least partly within the protrusion (113). In some embodiments, the protrusion (113) is depressible, so as to impart a force on the capsule (112). In some embodiments, applying a manual force to the protrusion (113) imparts a force on the capsule (113) which is sufficient to puncture the capsule (112), and for the pressurised fluid to escape into the void between the top of the solvent and the top of the solvent container (102), thereby imparting a pressure on the solvent container (102). In some embodiments, the protrusion (113) may include a sharp object on the underside to assist with puncturing the capsule (112).

Figure 14:
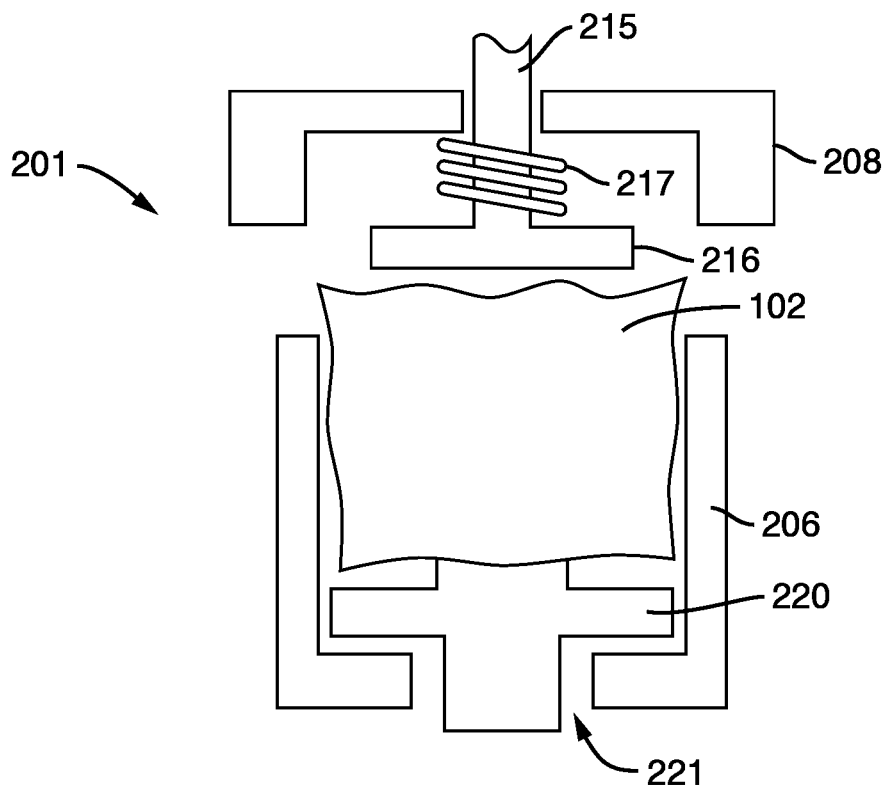
FIG. 14 shows an embodiment of the present disclosure having a pressurized solvent source including a force applicator in the form of a plunger.

FIG. 14 shows a pressurized solvent source (201) including a chamber (206) and a force applicator comprising a plunger (215). The solvent container (102) can be at least partially received in the chamber (206), and the plunger (215) engages with the solvent container (102). In some embodiments, the plunger (215) can be configured for linear translation within the chamber (206). The plunger (215) can apply a force to the solvent container (102) to selectively pressurize the container (102). In some embodiments, a spring (217) is provided between a lid (208) of the chamber (206) and the plunger (215). The spring (217) can bias the plunger (215) into engagement with the solvent container (102) to selectively pressurize the solvent container (102). In one embodiment, the plunger (215) comprises a plunger head (216) which is sized so as to apply a force over a relatively large surface of the axial end of the solvent container (102). In some embodiments, the lid (208) is releasably securable to the chamber (206) (e.g. with a screw thread)

In the embodiment shown in FIG. 14, the pressurized solvent source (201) further includes a mounting plate (220), to which the solvent container (102) is connectable or connected. The mounting plate (220) may be integrally formed with the end of the solvent container (102). The mounting plate (220) has a diameter which is greater than the mouth (221) of the base of the chamber (206), so as to retain the mounting plate (220) and solvent container (102) within the chamber (206), in a similar manner to a sealant/caulking gun.

The plunger (215) may be linearly translated by any suitable drive arrangement or force applicator, such as a linear motor, pressurized fluid, rotary drive etc. In some embodiments, a constant force is applied to the solvent container (102) in use.

Figure 15:
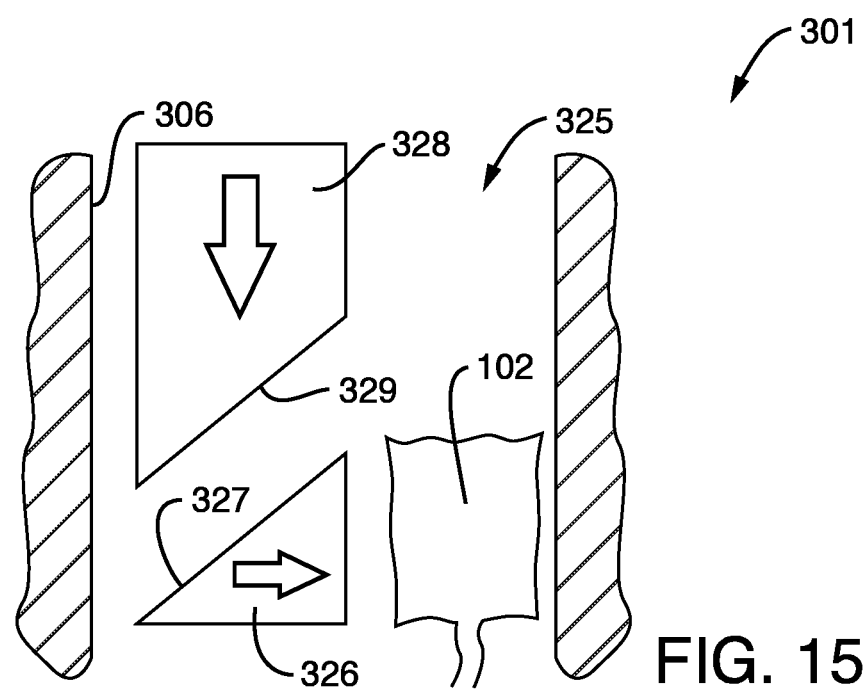
FIG. 15 shows an embodiment of the present disclosure having a pressurized solvent source including a force applicator comprising one or more wedges.

In other embodiments, as illustrated in FIG. 15, the force applicator can include one or more wedge (326, 328). In the embodiment shown in FIG. 16, the force applicator comprises a first wedge member (326) having a first wedge surface (327) and being mounted for linear translation towards the solvent container (102). The force applicator further includes a second wedge member (328) having a second wedge surface (329) and being mounted for linear translation towards the first wedge member (326). The first (327) and second (329) wedge surfaces are engagable with one another to apply a force to the solvent container (102), to selectively pressurize the solvent container (102). In the embodiment shown, the pressurized solvent source (301) further includes a chamber (306) having a wall. As will be appreciated from FIG. 16, as the second wedge member (328) is driven downward, the interaction of the first (327) and second (329) wedge surfaces will cause the first wedge member (326) to translate towards the right, which in turn applies a force to the solvent container (102).

Figure 16:
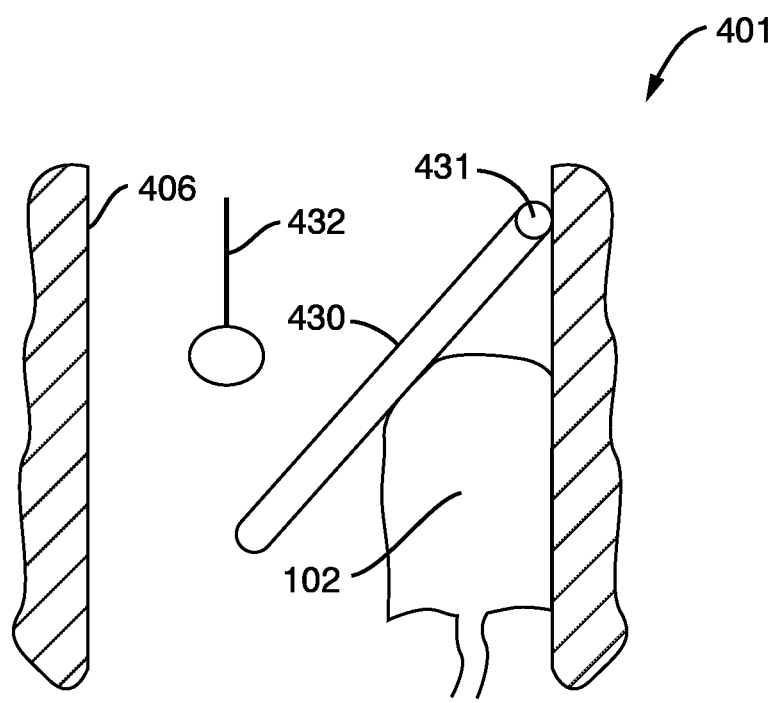
FIGS. 16 & 17 show an embodiment of the present disclosure having a pressurized solvent source including a force applicator in the form of a pressure plate.
Figure 17:
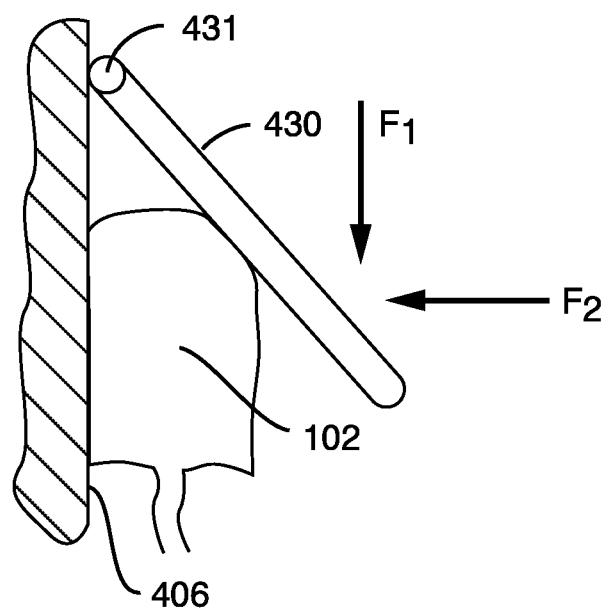

In the embodiments shown in FIGS. 16 and 17, the force applicator comprises a pressure plate (430).

Figure 18:
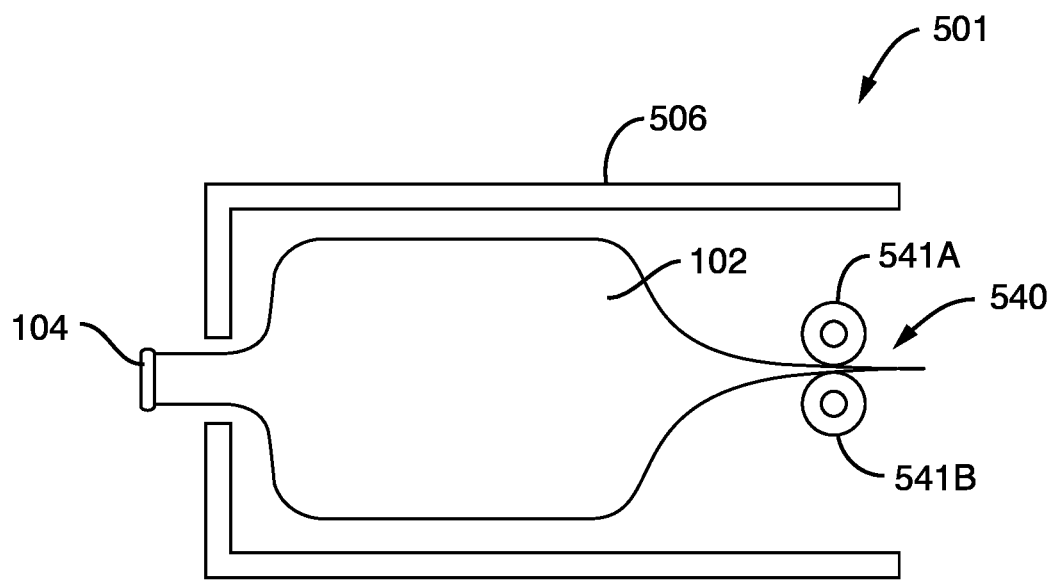
FIG. 18 shows an embodiment of the present disclosure having a pressurized solvent source including a force applicator in the form of a roller arrangement.

The pressurized solvent source (401) illustrated includes a chamber (406) having a wall, and a pressure plate (430) hingedly secured to the wall of the chamber (406) at a pivot point (431). The solvent container (102) is arranged between a first side of the pressure plate (403) and the wall of the chamber (406), and the force applicator (432) is configured to impart a force on the second (opposite) side of the pressure plate (430). It will be appreciated from FIG. 17 that as the force applicator (432) engages with the pressure plate (430), the pressure plate (430) will pivot about pivot point (431) and apply a force to the solvent container (102). The pressure plate (430) will apply a force to the solvent container (102) so long as there is at least a component of an applied force acting in a direction perpendicular to the surface of the pressure plate (430). FIG. 18 illustrates that, as long as the pressure plate (430) is at an angle to the vertical or horizontal directions, the application of a purely vertical (F1) or purely horizontal (F2) force to the pressure plate (430) will cause a corresponding force to be applied to the solvent container (102).

FIG. 18 illustrates an embodiment in which the force applicator of the pressurized solvent source (501) includes a roller mechanism. As illustrated in FIG. 18, the force applicator comprises a roller arrangement (540), comprising a pair of rollers (541A, 541B). The rollers (541A, 541B) are urged towards one another, so as to maintain a substantially predetermined gap therebetween. The rollers (541A, 541B) are optionally biased towards one another. In use, the end of the solvent container (102) distal from the solvent outlet (104) is fed into the roller arrangement (540), and progressively drawn therethrough so as to apply a pressure to the solvent container (102), thereby dispensing the solvent. The roller mechanism (540) may be translatable with respect to the solvent container (102) and/or the chamber (506) in which it is installed. As the solvent container (102) is drawn into the roller mechanism (504), it causes the progressive reduction of the internal volume of the solvent container (102), thereby dispensing the solvent.

The pressurized solvent source (101) shown in FIG. 10 may form part of a chromatographic solvent delivery system comprising a solvent source comprising a solvent container having a solvent outlet arranged below the solvent container, such that a solvent at the solvent outlet is pressurized due to gravity.

Figure 19:
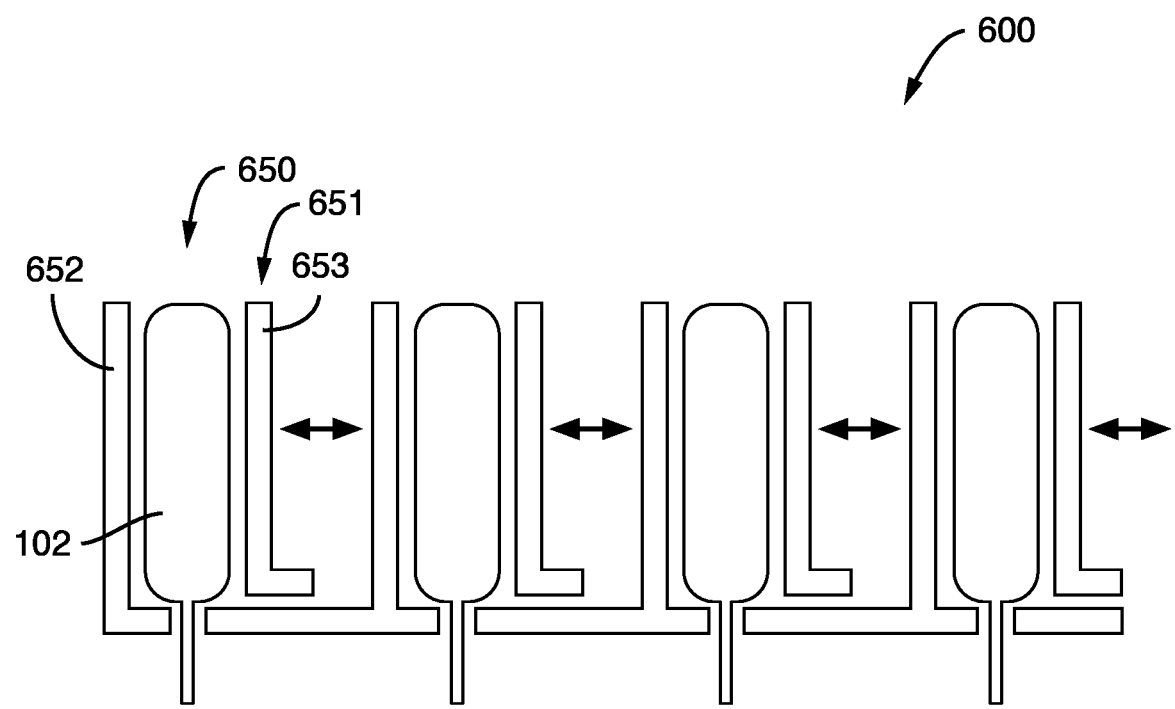
FIG. 19 shows an embodiment of the present disclosure having a pressurized solvent source including a plurality of solvent bays.

As shown in FIG. 19, in another embodiment, the present disclosure relates to a pressurized solvent source (600) comprising a plurality of solvent bays (650), wherein each solvent bay (650) comprises a force applicator (651) and being configured to receive a solvent container (102). Each force applicator (651) is individually controllable to apply a force to the corresponding solvent container (102) receivable in the corresponding bay (650).

In some embodiments, each solvent bay (650) can comprise a backing plate (652), and each force applicator (651) comprises a pressure plate (653). The pressure plate (653) is moveable towards or away from the corresponding backing plate (652) of the respective solvent bay (650). In some embodiments, a spacer (not shown) can be connected to the backing plate (652) to limit the minimum distance between the backing plate (652) and the pressure plate (653) in use. Alternatively, the spacer may be connected to the back of the pressure plate (653). In some embodiments, each solvent bay (650) can comprise a sensor (not shown) to detect the presence of at least one solvent container (102) therein. In some embodiments, the force applicator (651) can be configured to apply a substantially constant force in use. In some embodiments, the force applicator (651) is actuated by a motor, air source or other driving device (not shown). In some embodiments, the force applicator may comprise any of the arrangements shown in FIGS. 12 to 18 and as described herein. In the embodiment shown in FIG. 19, the pressurized solvent source (600) comprises four solvent bays (650A), to (650B).

A benefit of the embodiment illustrated in FIG. 19 is that the pressurized solvent source (600) can be used to create a gradient run or assist with the gradient formation. In a gradient run, the composition of the various component solvents must change over time. The embodiment illustrated in FIG. 20 allows for the pressure applied to each of the solvent containers (102) to be controlled so as to create the desired gradient.

A solvent container embodying the present invention can include a blending and/or mixing mechanism to blend and/or mix the solvent(s) within the solvent container. The blending/mixing mechanism may include a rotating mechanical element, which may comprise or be powered by a magnetic drive mechanism.

The system can also use one or more sensors to indicate the available solvent levels. FIG. 3 shows a system configured to sense the solvent supply level using a supply actuator piston. Usually operators are required to closely monitor remaining solvent supplies in order to assure run completion. The system of the present disclosure can provide a means to monitor the actual remaining solvent capacity at start up as opposed to simply calculating the remaining solvent supply by manually inputting solvent data into a controller.

FIG. 3 shows a flexible solvent container system having an optical sensor (16) located at the side of the container and chamber. The container, the chamber or both can be clear or designed to allow the optical sensor to monitor the solvent level from outside of one or both. In another embodiment, a magnetic sensor system (not shown) can be used. The optical and magnetic sensors can be used separately or can be combined in different configurations for the same or different solvent containers. The system shown in FIG. 3 also has a second optical sensor (18) connected to the shaft. An optical encoder can obtain the position of the shaft. For example, the piston can act as the signaling device. The sensor can monitor the position of the shaft, piston or both as a measure of the solvent level in the container. The electric load applied to the piston actuator can be used to measure the pressure inside the container. The container parameters, solvent, volume, etc. can be identified and used by the controller to determine, with the information from one or more sensors, how much solvent is being used and how much solvent remains in the container.

The present disclosure also relates to a vent valve to evacuate gas, e.g., air, from a chromatographic solvent supply line. The vent valve can be positioned between the chromatographic solvent supply and the pump inlet and can remove all or substantially all of the gas from the solvent supply line, including gas that may be introduced by a solvent supply changeover. The vent valve can remove or filter out gas bubbles from the line automatically or with minimal user intervention.

In one embodiment, the present disclosure relates to a vent valve including a main body having central axis, a top side and a bottom side, the body having an inlet and an outlet wherein the inlet is positioned closer to the bottom side than the outlet, the top side or upper portion can have an opening or second outlet. The top side opening can have a cap having the second outlet. The optional cap can be attached to the cylinder at or near the top. The vent valve can further include a mechanism to allow gas or air to escape or exit out the top or upper opening or second outlet but prevents solvent from escaping or exiting out the same top or upper opening or second outlet. The mechanism can include a buoyant ball contained within the main body having a diameter equal to the internal diameter of the main body, wherein the ball is able to freely move up and down inside the main body, a seat and a plunger device contained in or on the cap, or both.

The vent valve can replace or supplement an intake line degasser to prevent or reduce solvent degassing. The vent valve can be free standing and not require any external operators. The device can shorten a chromatographic pump purge cycle by pre-removal of entrapped gas that may be introduced during solvent supply replenish. The vent valve device can reduce the purge cycle by about 20%, 40%, 60%, 80% or about 100% of the original time required for a purge cycle. The vent valve device can remove 50%, 60%, 70%, 80%, 85%, 90%, 95%, 98% or 99% of the gas, e.g., air, from the solvent supply line. These values can be used to define a range, such as about 50% to about 80%, or about 70% to about 90%.

The vent valve can be positioned downstream of the solvent source and container, and upstream of the pump. The vent valve can work as a passive mechanism which senses entrapped gas/air in the solvent supply line. It can remain closed when no gas/air is present and can remain open as the gas/air levels increase. The vent valve can activate when gas or air is present in the solvent line and provide a path for its expulsion. When solvent reaches the vent valve, it can close the air/gas expulsion port and preventing solvent from escaping. The vent valve can deliver uninterrupted solvent access.

Figure 4B:
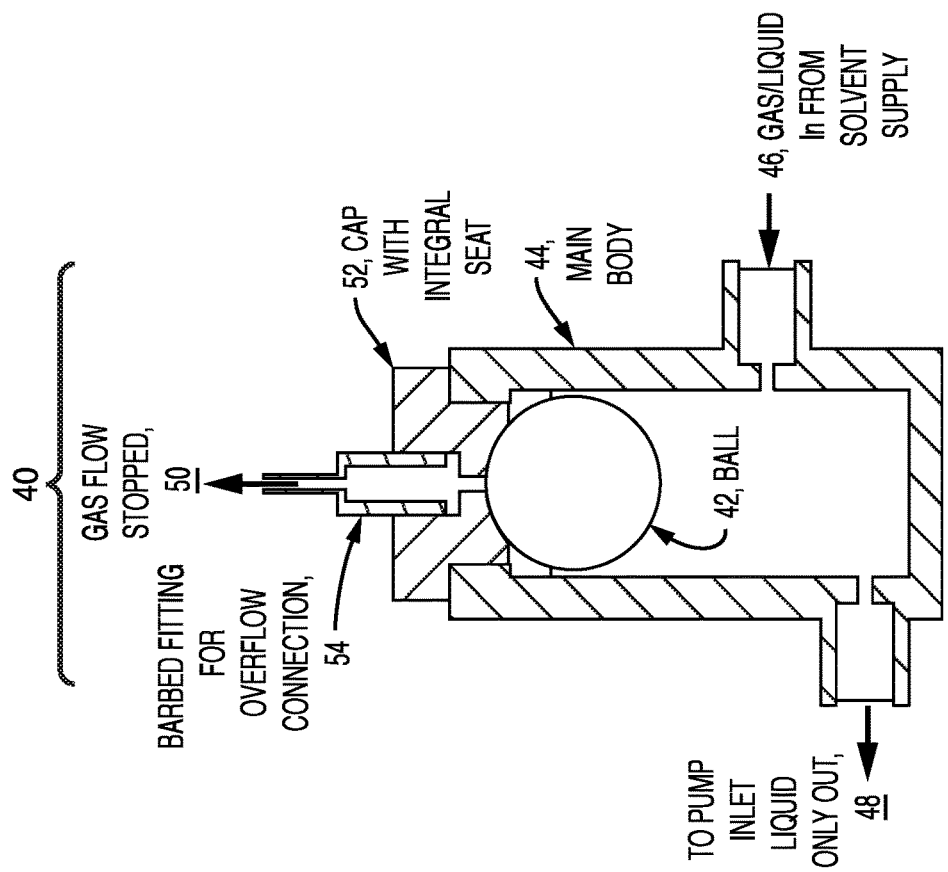
FIG. 4A-B shows an embodiment of the present disclosure having a vent valve with a buoyant ball in the lower portion of the valve. The vent valve has a cap with an integral seat on the top of the valve with a barbed fitting for overflow connection.
Figure 4A:
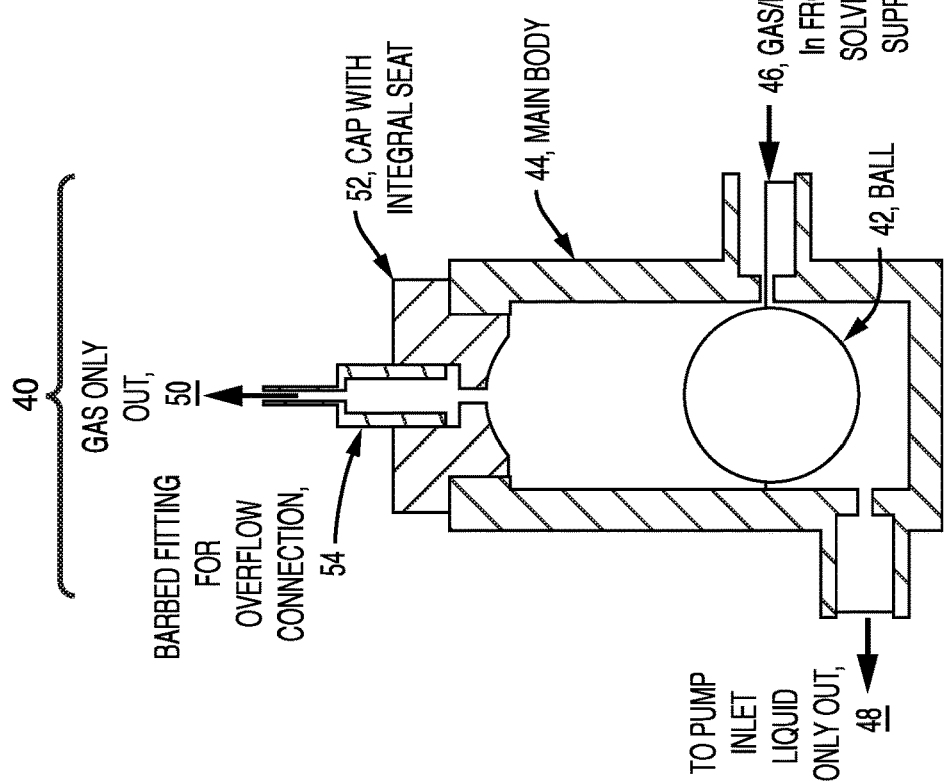

FIG. 4A shows a vent valve (40) having a buoyant ball (42) in the lower portion of the main body (44). FIG. 4A is in an open position and configured to vent gas. FIG. 4B shows a vent valve (40) having a buoyant ball (42) in the upper portion of the main body (44). FIG. 4B is in a closed position and can be incapable of venting gas. The vent valve (40) can have a main body (44), an solvent/gas inlet (46) from the solvent supply, a solvent outlet (48) to the pump inlet, and a top. The main body can have a central axis, a top side and a bottom side. The main body can have any shape, including a cylindrical shape. The solvent/gas inlet (46) and the solvent outlet (48) can be positioned in the lower portion (lower half, third, quarter) of the main body (44). The inlet (46) can be positioned closer to the bottom side than the outlet (48). The internal volume of the main body (44) can be about, or less than about, 50 mL, 40, 30, 20, 10, 9, 8, 7, 6, 5, 4, 3, 2, 1, 0.9, 0.8, 0.7, 0.6, 0.5, 0.4, 0.3, 0.2, 0.1, 0.09, 0.08, 0.07, 0.06 or about 0.05 mL. These values can be used to define a range, such as about or less than about 3 to about 0.5 mL.

The top side or the upper portion of the main body (44) can have an opening or a second outlet (50) for gas or air to escape or exit the main body (44). The top side opening can also be fitted with a cap having an integral seat (52) to be securely attached to the top side of the main body (44). The cap (52) can have a second opening (50) for the gas to escape or exit. As shown in FIG. 4, the cap (52) can also have a fitting (54), e.g., a barbed fitting, to provide a path for solvent overflow. As shown in FIG. 4A, the gas flow out is open when the ball (42) is in the lower portion. FIG. 4B shows a vent valve (40) with a buoyant ball (42) in the upper portion and in a closed position. As shown in FIG. 4B, the gas flow out is stopped when the ball (42) is engaged with, or in contact with, the outlet (50).

The vent valve (40) can include a mechanism to allow gas or air to escape or exit out the top or upper opening or second outlet (50) but prevents solvent from escaping or exiting out the same top or upper opening or second outlet (50). One such mechanism is a buoyant ball (42), as shown in FIG. 4. The ball (42) can be contained within the main body (44) and have a diameter equal to, or substantially equal to, the internal diameter of the main body (44). The ball (42) can be able to freely move up and down inside the main body (44). The ball (42) can allow gas to freely passing by, through or around the ball (42). The ball (42) can restrict or prevent solvent from freely passing by, through or around the ball (42). When solvent interacts with the ball (42), the ball (42) can be forced upwards toward the top side and can block or otherwise prevent the solvent from escaping or exiting the top opening or second outlet (50).

Figure 5B:
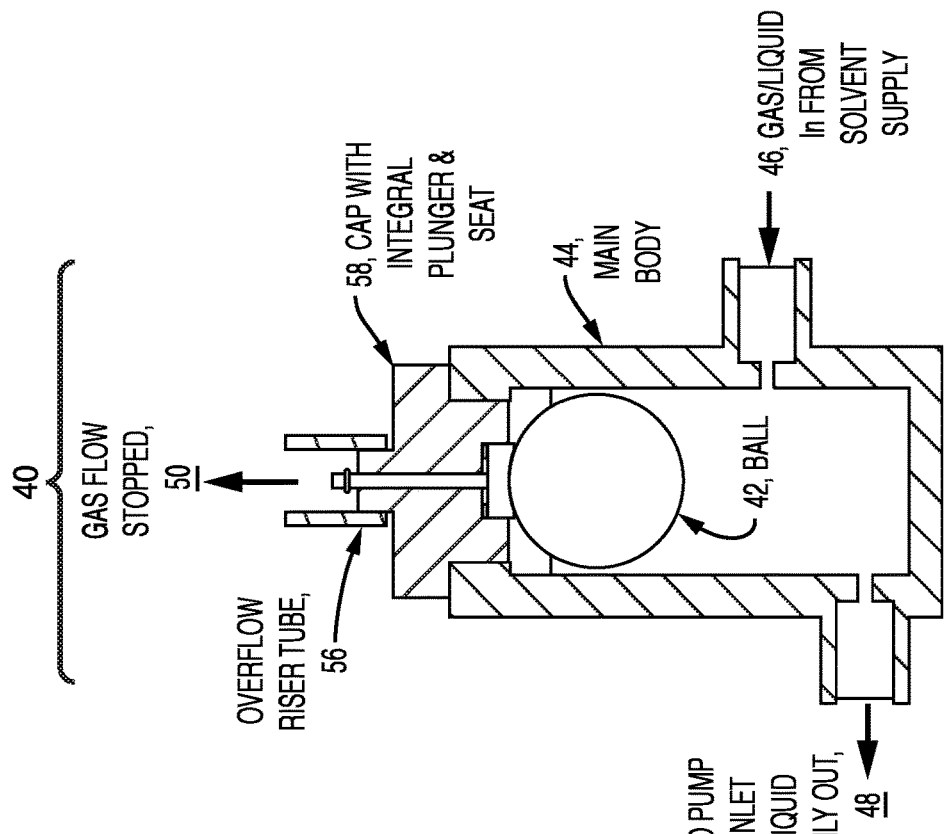
FIG. 5B shows an embodiment of the present disclosure having a vent valve with a buoyant ball in the upper portion and a plunger and seat mechanism. The vent valve is in a closed position.
Figure 5A:
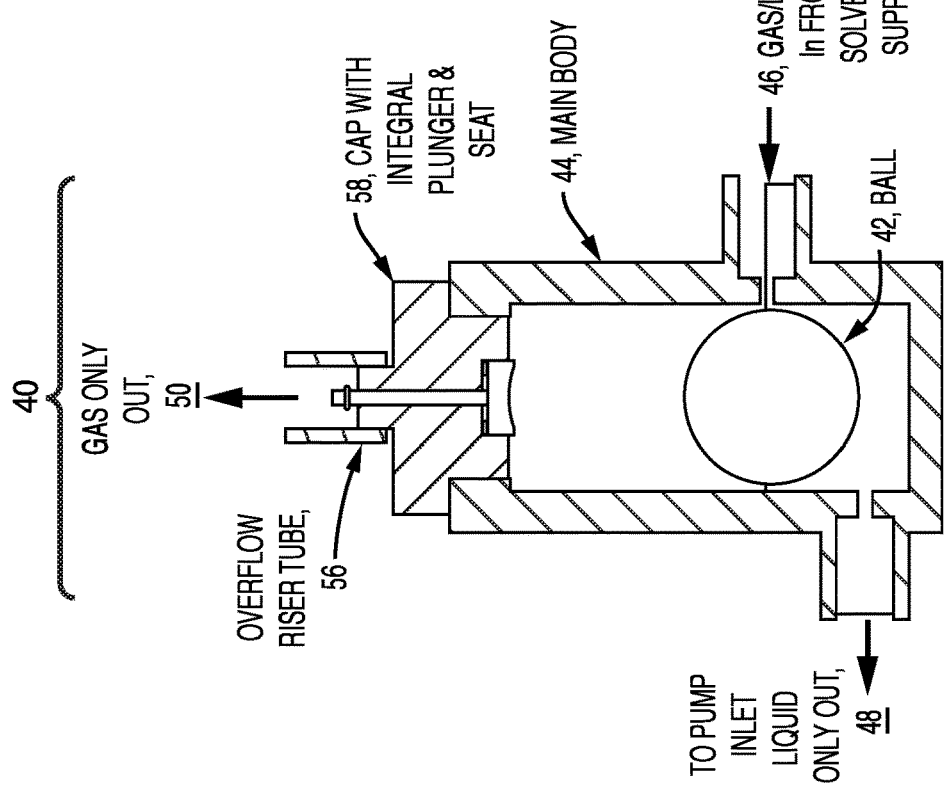
FIG. 5A shows an embodiment of the present disclosure having a vent valve with a buoyant ball in the lower portion and a plunger and seat mechanism. The valve is in an open position. The vent valve has a cap with an integral seat on the top of the valve with an overflow riser tube.

The top side of the main body (44) or the cap (52) attached to the top side can contain an overflow riser tube (56). The riser tube (56) can contain any solvent that escapes or exit through the top or second opening (50). It can also contain and direct the exiting gas to an auxiliary stream, e.g., waste stream. FIG. 5A shows a vent valve (40) having a buoyant ball (42) in the lower portion and a cap with a plunger and seat mechanism (58). The vent valve (40) has a cap with an integral seat (58) on the top of the vessel with an overflow riser tube (56). As shown in FIG. 5A, the gas flow out is open when the ball (42) is in the lower portion. FIG. 5B shows a vent valve (40) having a buoyant ball (42) in the upper portion and engaged with the plunger and seat mechanism (58). As shown in FIG. 5B, the gas flow out is stopped by the plunger and seat (58) when the ball (42) is touching, or otherwise engaged with, the plunger (58).

Once exhausted, the solvent container can be replaced. The replacement can include removing the supply line or tubing from the solvent container. During the removal and before replacing the line or tubing into a new solvent container, gas or air can inadvertently enter the supply line or tube and become entrapped within the connection. After replacement of the solvent, the chromatographic pump can be cycled and purged for a period of time to ensure complete removal of any entrapped gas. During this cycle, the vent valve can be used to quickly remove any gas from the lines and promote a liquid only supply to the pump. For example, as solvent is pushed from the solvent source and container, the solvent can enter the main body of the vent valve. Gas can migrate up to the upper portion of the main body or chamber, while liquid can be passed through the lower outlet. As gas evacuates or exits the chamber, the supply solvent fills causing the mechanism, e.g. ball, to close off the gas evacuation port.

Figure 6A:
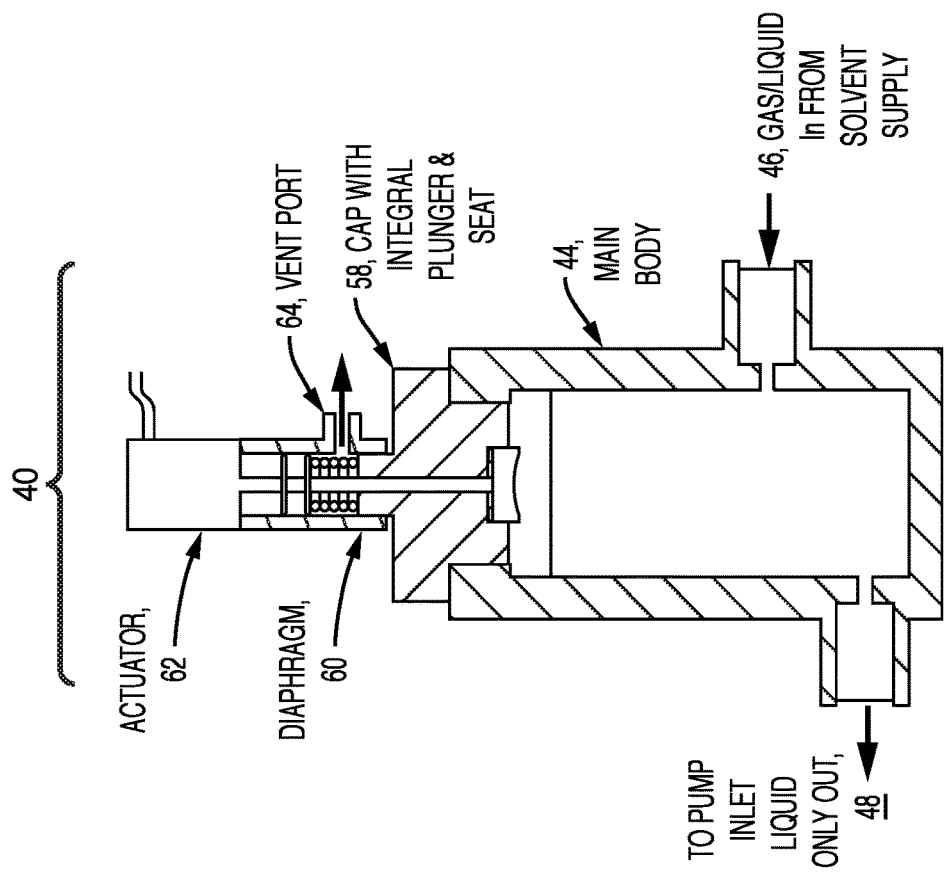
FIG. 6A shows an embodiment of the present disclosure having a vent valve with a plunger and seat mechanism, which are controlled by an actuator and a diaphragm. The valve is in the open position. The vent valve has a cap with an integral seat on the top of the vessel with a diaphragm and actuator.
Figure 6B:
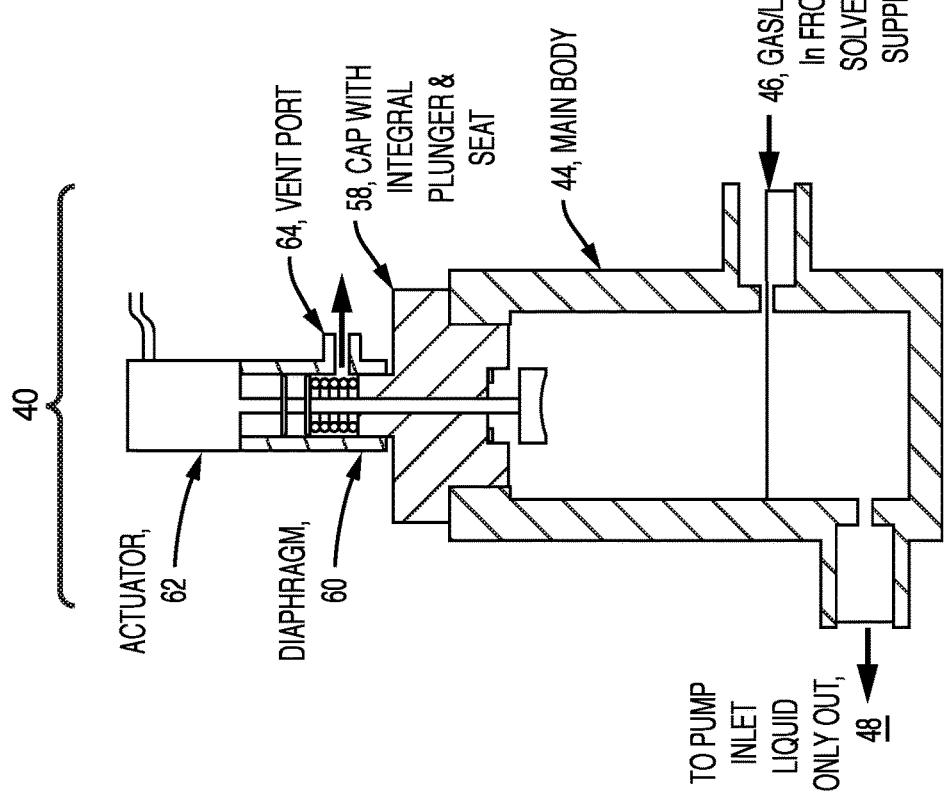
FIG. 6B shows an embodiment of the present disclosure having a vent valve with plunger and seat mechanism. The valve is in the closed position.

The vent valve (40) can contain a self-actuating mechanism, such as a seat and a plunger device (58) contained in or on the cap as shown in FIGS. 6A and 6B. FIG. 6A shows a vent valve (40) having a plunger and seat mechanism (58) in the open position. The vent valve (40) has a cap with an integral seat (58) on the top of the vessel with a diaphragm (60) and actuator (62). As shown in FIG. 6A, the gas and liquid flow out via the vent port (64) is open when the plunger is low or not engaged. FIG. 6B shows a vent valve (40) with plunger and seat (58) in the closed position. As shown in FIG. 6B, the gas and liquid flow out via the vent port (64) is stopped by the plunger. The plunger and seat mechanism can be actively controlled independently from the liquid level in the body. In another embodiment, a vent valve (40) can be an active valve as opposed to a passive, self-actuating valve. The vent valve (40) can include an actuator (62) connected to an external source to control the actuation of the valve (40). An external force or signal can be used to drive the valve both open and closed. The actuator (62) can be in signal communication with a controller.

Figure 8:
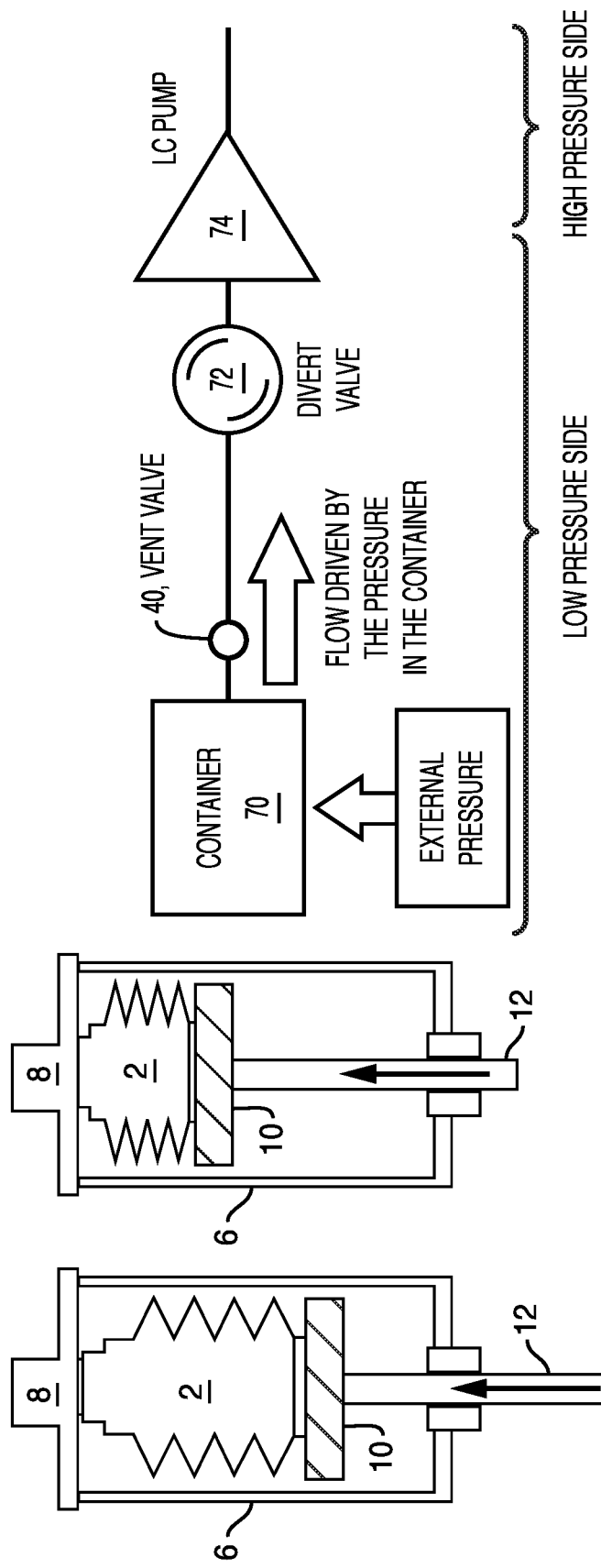
FIG. 8 shows an embodiment of the present disclosure having a chromatographic solvent delivery system with a pressurized solvent source driven by a piston, a vent valve, a divert valve and a pump. Both the vent valve and the divert valve are upstream of the pump in the low pressure side.

The vent valve (40) can be integrated into a chromatographic solvent supply system. FIG. 7 shows a chromatographic solvent delivery system with a pressurized solvent source or container (70), a vent valve (40), a divert valve (72) and a chromatography pump (74). The vent valve (40) and the divert valve (72) are placed on the low pressure side of the chromatography system, e.g., upstream of the pump (74). The vent valve (40) is shown with a buoyant ball (42) in the lower and open position, and in the upper and closed position. FIG. 8 shows a chromatographic solvent delivery system with a pressurized solvent source (70) driven by a piston (10), a vent valve (40), a divert valve (72) and a pump (74). Both the vent valve (40) and the divert valve (72) are upstream of the pump (74) in the low pressure side.

In another embodiment, the present disclosure relates to a system having automated liquid container switching. Currently, chromatography systems do not attempt to monitor solvent levels in solvent containers. Operators are responsible for ensuring there is sufficient solvent supply to complete the desired separation(s). Thus, unattended system operation is limited to the solvent container volume available in a single container. The system can employ a combination of liquid sensing and software. The chromatography system can detect when one or more solvent containers approaches an empty condition, or a condition wherein the next separation or set of separations cannot be completed, and switch the solvent flow from one or more solvent containers to available containers having sufficient solvent capacity.

The present disclosure relates to a chromatographic solvent delivery system including at least one pressurized solvent source having a first sensor configured to determine the amount of solvent remaining in the solvent container, at least one backup pressurized solvent source having a second sensor configured to determine the amount of solvent remaining in the solvent container, a switching valve in fluid communication with both solvent sources and a chromatography system, and a controller in data communication with the sensors, the controller having knowledge of future solvent requirements can be configured to switch the fluid connections between the solvent sources and the chromatography system.

For example, the chromatography system can be set up to analyze a series of samples. The solvent container(s) can be monitored by one or more sensors located on or at each of the solvent containers. When any specific container reaches at set point, just above empty or near a point where the separation or set of separations cannot be completed, the system can switch the solvent source from the near empty solvent source to a more full solvent source. The switching can be automated by the sensors, solvent containers, controller, etc. The switch from one solvent source to another can be by activating a switching valve to change to a readily available, full container of solvent. The switching valve can be in fluid communication with both solvent sources and a chromatography system.

The system can have container level sensing technology at each of the solvent locations in the chromatographic system. At each solvent container location, there can be a primary and at least one backup solvent position with a switching valve and tubing connections. The system can monitor each of these locations through one or more sensors or sensor types (e.g., optical, mechanical, magnetic). When a solvent container reaches a set limit, e.g., just above empty, the controller can switch the valve from the primary solvent container to a backup container without operator intervention. The controller can be in data communication with the one or more sensors. The controller can have knowledge of future solvent requirements and can be configured to switch the fluid connections between the solvent sources and the chromatography system.

The controller and related software can monitor each container level using sensing technology. The method or separation to be performed can also be inputted into the controller and related software. With the knowledge of the system method, the number of separations which can be performed from the primary solvent container or from a combination of the primary and secondary solvent container volumes can be calculated. The operator can be informed as to the length of time the system can be operated unattended with the present levels of solvents and predict replacement times.

In some embodiments, manual switching of the solvent containers can be utilized. Sensors can track the liquid level in each container and when one or more containers are near empty, the operator can switch the valve(s) manually to the filled containers. At some point the primary and back-up containers can be exhausted and one or both needs to be manually replaced. The constant level monitoring of one or more of the solvents and solvent containers allows system operators to predict, with the knowledge of the separation method, the amount of time before system shutdown due to solvent exhaustion. The operator of a chromatographic system can have extended unattended operation by supplying additional solvent volume in the second container, that automatically becomes available, when needed.

Figure 9:
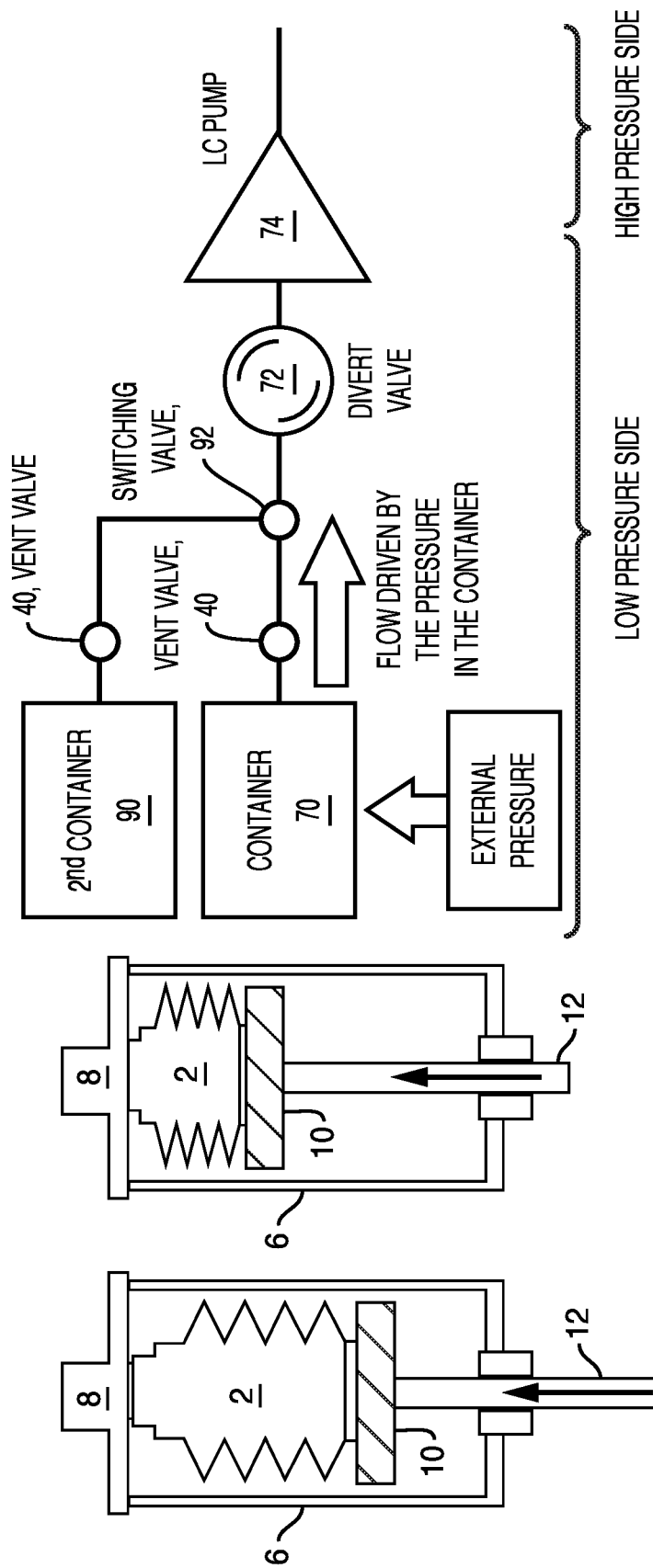
FIG. 9 shows an embodiment of the present disclosure having a chromatographic solvent delivery system with a pressurized solvent source and back up solvent source, both driven by a piston, vent valves downstream of each source, a switching valve, a divert valve and a pump. Both the vent valves and the divert valve are upstream of the pump in the low pressure side.

The present disclosure relates to a chromatographic solvent delivery system including a pressurized solvent source having a first sensor, a backup pressurized solvent source having a second sensor, a first vent valve in fluid communication with the pressurized solvent source, a second vent valve in fluid communication with the backup pressurized solvent source, a switching valve in fluid communication with the solvent sources, divert valve in fluid communication with the solvent sources, a pump in fluid communication with the divert valve, and a controller in data communication with the sensors, vent valves, switching valves, divert valve and pump, as described herein. FIG. 9 shows a chromatographic solvent delivery system with a pressurized solvent source (70) and a back-up or second solvent source (90), both solvent sources can be substantially identical in composition. Both solvent sources have applied pressure delivered by pistons (10). Each solvent source has a vent valve (40) downstream of each source. The system also has a switching valve (92) and a divert valve (72) upstream of a pump (74). Each component before the pump is located on the low pressure side of the chromatography system.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

What is claimed is:

1. A chromatographic solvent delivery system comprising:
    at least one pressurized solvent source;
    at least one divert valve in fluid communication with the at least one solvent source; and
    at least one vent valve in fluid communication with the at least one solvent source and including a buoyant ball disposed within and able to freely move up and down within a main body, wherein the at least one vent valve has a central axis, a top side and a bottom side, the main body having an inlet and an outlet wherein the inlet is positioned closer to the bottom side than the outlet, the top side having an opening; and
    a pump in fluid communication with the at least one divert valve,
    wherein the at least one divert valve is located in between the at least one solvent source and pump, and wherein the at least one divert valve is adapted for diverting at least one solvent flow stream to the pump or to an auxiliary flow path.

2. The chromatographic solvent delivery system of claim 1, wherein the at least one pressurized solvent source includes a solvent container having a solvent outlet arranged below the solvent container, such that the solvent at the solvent outlet is pressurized due to gravity.

3. The chromatographic solvent delivery system of claim 1, wherein the at least one pressurized solvent source includes: a plurality of solvent bays, each bay comprising a force applicator and being configured to receive a solvent container, each force applicator being individually controllable to apply a force to the corresponding solvent container in the corresponding bay.

4. The chromatographic solvent delivery system of claim 1, wherein the at least one pressurized solvent source comprises:
    a solvent container configured to be pressurized;
    a mechanism to engage with the container and configured to pressurize the container; and
    at least one sensor configured to determine the pressure, volume or solvent flow from, inside the container.

5. The chromatographic solvent delivery system of claim 4, wherein the mechanism is a piston and the at least one sensor is configured to determine the pressure, volume or solvent flow from the position of the piston.

6. A chromatographic solvent delivery system comprising:
    at least one pressurized solvent source having a first sensor configured to determine an amount of solvent remaining in a solvent container;
    at least one backup pressurized solvent source having a second sensor configured to determine the amount of solvent remaining in the solvent container;
    a switching valve in fluid communication with both solvent sources and a chromatography system;
    at least one vent valve in fluid communication with the at least one pressurized solvent source and including a buoyant ball disposed within and able to freely move up and down within a main body; wherein the at least one vent valve has a central axis, a top side and a bottom side, the main body having an inlet and an outlet wherein the inlet is positioned closer to the bottom side than the outlet, the top side having an opening; and
    a controller in data communication with the first sensor and the second sensor, the controller having knowledge of future solvent requirements and configured to switch fluid connections between the solvent sources and the chromatography system.

7. The chromatographic solvent delivery system of claim 6, wherein at least one of the pressurized solvent source and the backup pressurized solvent source includes a solvent container having a solvent outlet arranged below the solvent container, such that the solvent at the solvent outlet is pressurized due to gravity.

8. The chromatographic solvent delivery system of claim 6, wherein at least one of the pressurized solvent source and the backup pressurized solvent source comprises:
    a solvent container configured to be pressurized;
    a mechanism to engage with the solvent container and configured to pressurize the solvent container; and
    at least one sensor configured to determine a pressure, volume, or solvent flow from inside the container.

9. The chromatographic solvent delivery system of claim 8, wherein the mechanism is a piston and the at least one sensor is configured to determine the pressure, volume or solvent flow from the position of the piston.

10. A chromatographic solvent delivery system comprising:
    a pressurized solvent source having a first sensor;
    a backup pressurized solvent source having a second sensor;
    a first vent valve in fluid communication with the pressurized solvent source;
    a second vent valve in fluid communication with the backup pressurized solvent source;

a switching valve in fluid communication with the solvent sources;

a divert valve in fluid communication with the pressurized solvent source and the backup pressurized solvent source;

a pump in fluid communication with the divert valve, and a controller in data communication with the sensors, vent valves, switching valve, divert valve, and pump;

wherein the first vent valve or the second vent valve includes a buoyant ball disposed within and able to freely move up and down within a main body, and wherein the first vent valve or the second vent valve has a central axis, a top side and a bottom side, the main body having an inlet and an outlet wherein the inlet is positioned closer to the bottom side than the outlet, the top side having an opening.

11. The chromatographic solvent delivery system of claim 10, wherein at least one of the first and second vent valves comprises:

a mechanism to allow gas or air to escape or vent out the top side or opening but prevent solvent from escaping or venting out the same top side or opening.

12. The chromatographic solvent delivery system of claim 10, wherein at least one of the pressurized solvent source or the backup pressurized solvent source includes a solvent container having a solvent outlet arranged below the solvent container, such that the solvent at the solvent outlet is pressurized due to gravity.

13. The chromatographic solvent delivery system of claim 10, wherein at least one of the pressurized solvent source and the backup pressurized solvent source comprises:

a solvent container configured to be pressurized;

a mechanism to engage with the solvent container and configured to pressurize the solvent container; and at least one sensor configured to determine a pressure, volume, or solvent flow from inside the container.

14. The chromatographic solvent delivery system of claim 13, wherein the mechanism is a piston and the at least one sensor is configured to determine the pressure, volume, or solvent flow from the position of the piston.

* * * * *